US012051384B2

(12) United States Patent
Kim et al.

(10) Patent No.: US 12,051,384 B2
(45) Date of Patent: Jul. 30, 2024

(54) FOVEATED DISPLAY AND DRIVING SCHEME

(71) Applicant: Meta Platforms Technologies, LLC, Menlo Park, CA (US)

(72) Inventors: Gyungmin Kim, Santa Clara, CA (US); Min Hyuk Choi, San Jose, CA (US); Takanori Shibasaki, Cupertino, CA (US); Qianqian Wang, Santa Clara, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/115,938

(22) Filed: Mar. 1, 2023

(65) Prior Publication Data

US 2023/0282177 A1 Sep. 7, 2023

Related U.S. Application Data

(60) Provisional application No. 63/316,186, filed on Mar. 3, 2022.

(51) Int. Cl.
*G09G 3/36* (2006.01)

(52) U.S. Cl.
CPC ... *G09G 3/3677* (2013.01); *G09G 2300/0452* (2013.01); *G09G 2330/021* (2013.01); *G09G 2380/00* (2013.01)

(58) Field of Classification Search
CPC .................................................... G09G 3/3677
See application file for complete search history.

(56) References Cited

U.S. PATENT DOCUMENTS

2003/0020702 A1* 1/2003 Matsuyama ........... G09G 3/367 345/204
2014/0266990 A1 9/2014 Makino et al.
2019/0114955 A1 4/2019 Yamamoto et al.
2019/0164468 A1 5/2019 Jung
2019/0164489 A1* 5/2019 Zhang .................. G09G 3/3258
2021/0313415 A1 10/2021 Ma et al.

FOREIGN PATENT DOCUMENTS

JP 2003162236 A 6/2003
JP 2007094089 A 4/2007

OTHER PUBLICATIONS

J-PlatPat JP,2003-162236,A machine translation (Year: 2023).*
International Search Report and Written Opinion for International Application No. PCT/US2023/014422, mailed May 8, 2023, 13 pages.

* cited by examiner

*Primary Examiner* — Gustavo Polo
(74) *Attorney, Agent, or Firm* — Weaver Austin Villeneuve & Sampson LLP

(57) ABSTRACT

A display may be foveated to reduce power consumption and increase row scan timing margin. In one embodiment, the display includes pixels, where a first set of the pixels are formed to have a low resolution and a second set of the pixels are formed to have a high resolution. A first subset of the first set of pixels is formed in a first pixel cell layout and includes anodes formed in a first anode layout. A second subset of the second set of pixels is formed in a second pixel layout and includes anodes formed in a second anode layout. In another embodiment, the display similarly includes pixels formed to have a low resolution or a high resolution. The pixels of this embodiment may be formed in the same anode layout.

20 Claims, 13 Drawing Sheets

800

FOVEATED DISPLAY AND DRIVING SCHEME

CROSS REFERENCE TO RELATED APPLICATIONS

This application claims the benefit of U.S. Provisional Application No. 63/316,186, filed Mar. 3, 2022, which is incorporated by reference in its entirety.

FIELD OF THE INVENTION

This disclosure relates generally to display devices, and more specifically to foveated displays for display devices.

BACKGROUND

The display device in Augmented Reality (AR) and Virtual Reality (VR) devices plays a role in creating a believable and immersive experience for users. A display for AR/VR device has features such as high image quality, a wide field of view, low latency, and accurate color reproduction. The image quality is generally high enough to create a convincing and realistic environment, with a wide field of view that gives the user a sense of presence. Low latency is also crucial in AR/VR to reduce motion sickness and provide a smooth user experience. Accurate color reproduction also enables the realism of the virtual environment.

The design of displays may include pancake optics, micro displays, or alternative design configurations to achieve smaller form factor or higher resolution. However, pancake optics and micro displays results in higher luminance with low persistence. In turn, these display devices have higher power consumption.

SUMMARY

A display may be foveated to reduce power consumption and increase row scan timing margin. In one embodiment, a display includes pixels on a substrate, where the pixels include a first set of pixels and a second set of pixels. The first set of pixels can be formed to have a first resolution, where a first subset of the first set of pixels is formed in a first pixel cell layout. The first subset of pixels may include anodes formed in a first anode layout. The second set of pixels can be formed to have a second resolution, where a second subset of the second set of pixels is formed in a second pixel layout. The second subset of pixels may include anodes formed in a second anode layout. The display may further include a first set of scan lines disposed on the substrate, where the first set of scan lines is connected to at least the first subset of pixels. The display may further include a second set of scan lines disposed on the substrate, where the second set of scan lines are connected to at least the second subset of pixels.

In some embodiments, the pixels further include a third set of the pixels formed to have the first resolution, where a third subset of the third set of pixels is formed in a third pixel cell layout, and where a fourth subset of the third set of pixels is formed in a fourth pixel layout.

In some embodiments, the third pixel cell layout includes two or more of the second set of scan lines, each of the two or more scan lines connected to a respective pixel of the third subset of pixels, and display lines, each of the display lines connected to two or more of the third subset of pixels.

In some embodiments, the fourth pixel cell layout includes a scan line of the first set of scan lines connected to one of the fourth subset of pixels, and display lines, each of the display lines connected to a respective pixel of the fourth subset of pixels.

In some embodiments, the first set of scan lines is further connected to at least one of the third set of pixels having the third pixel cell layout.

In some embodiments, the second set of scan lines is further connected to at least one of the third set of pixels having the fourth pixel cell layout.

In some embodiments, the display further includes scan line drivers connected to the scan lines, where the scan line drivers are configured to drive a scan signal to two or more subpixels of the third subset of pixels, the two or more subpixels associated with a same color.

In some embodiments, the first pixel cell layout includes a scan line of the first set of scan lines, and a bypassed scan line of the first set of scan lines.

In some embodiments, the second pixel cell layout includes two or more scan lines of the second set of scan lines, each of the two or more scan lines connected to at least two of the second subset of pixels, and display lines, each of the display lines connected to two or more pixels of the second subset of pixels.

In some embodiments, the display further includes scan line drivers connected to the scan lines, where a pair of sequentially connected scan line drivers includes a scan line driver that is bypassed. The bypassed scan line driver may be connected to a bypassed scan line of the scan lines.

In another embodiment, a display includes pixels on a substrate, where the pixels include a first set of pixels and a second set of pixels. The first set of pixels can be formed to have a first resolution, where a first subset of the first set of pixels is formed in a first pixel cell layout. The second set of pixels can be formed to have a second resolution, where a second subset of the second set of pixels is formed in a second pixel layout. The first subset of pixels and the second subset of pixels may include anodes formed in the same anode layout. The display may further include a first set of scan lines disposed on the substrate, where the first set of scan lines is connected to at least the first subset of pixels. The display may further include a second set of scan lines disposed on the substrate, where the second set of scan lines are connected to at least the second subset of pixels.

In some embodiments, the first pixel cell layout includes one of the first set of scan lines, twelve driving transistors, and three switching transistors.

In some embodiments, a second subset of the first set of pixels is formed in a third pixel cell layout that includes two of the second set of scan lines, twelve driving transistors, and six switching transistors.

In some embodiments, a third subset of the first set of pixels is formed in a fourth pixel cell layout that includes one of the first set of scan lines, twelve driving transistors, and six switching transistors.

Other aspects include components, devices, systems, improvements, methods, processes, applications, computer readable mediums, and other technologies related to any of the above.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
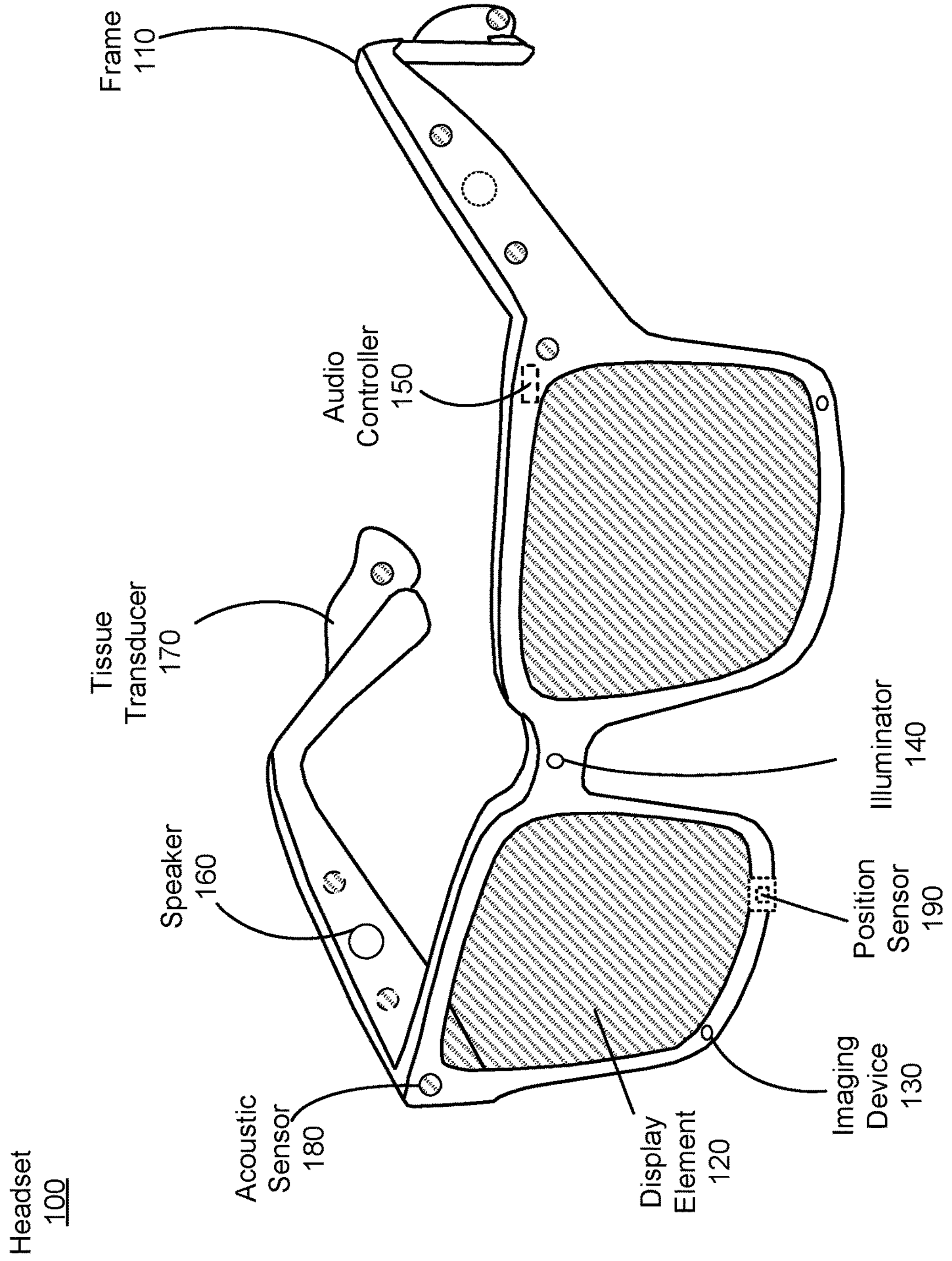
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
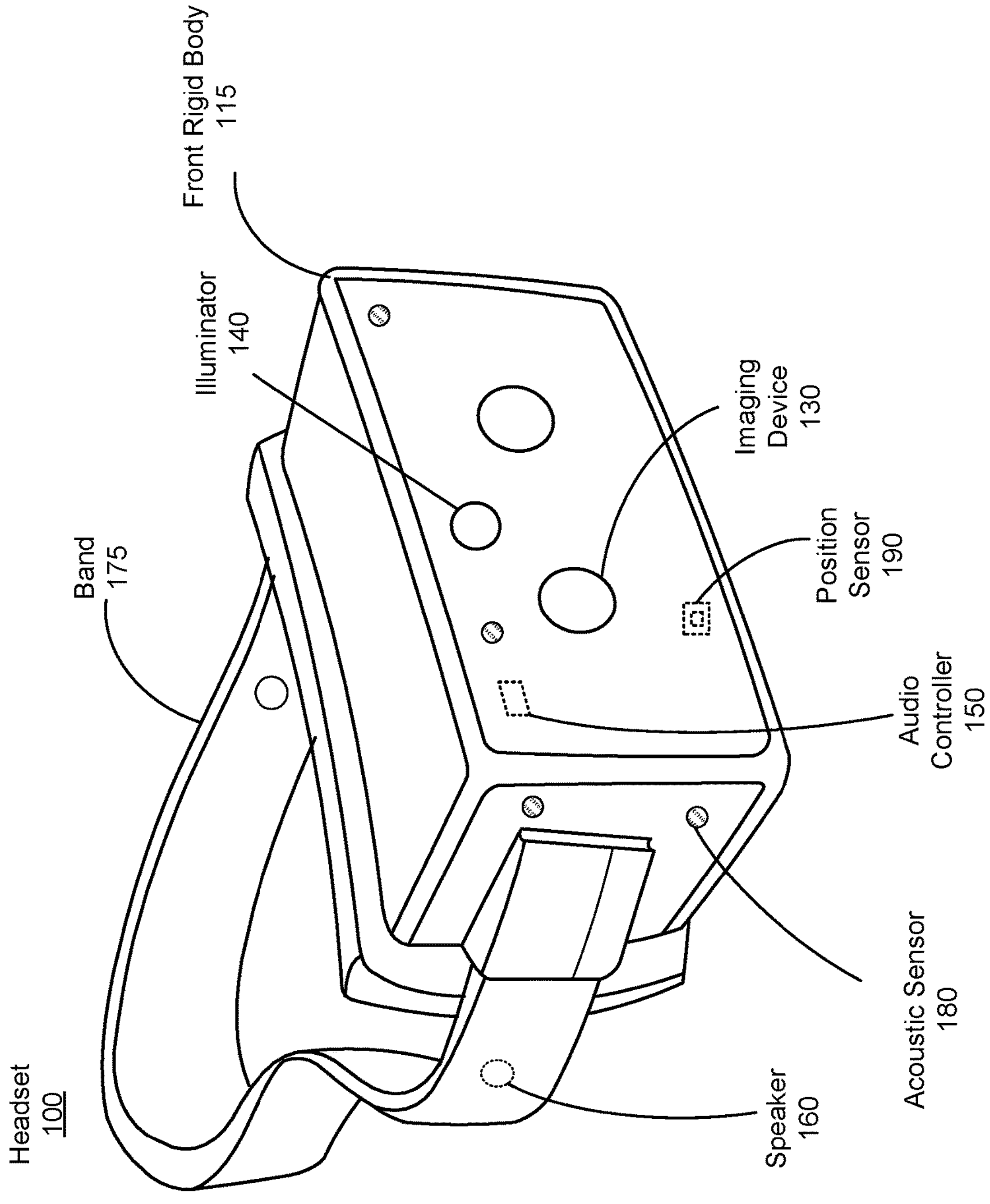
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 1C:
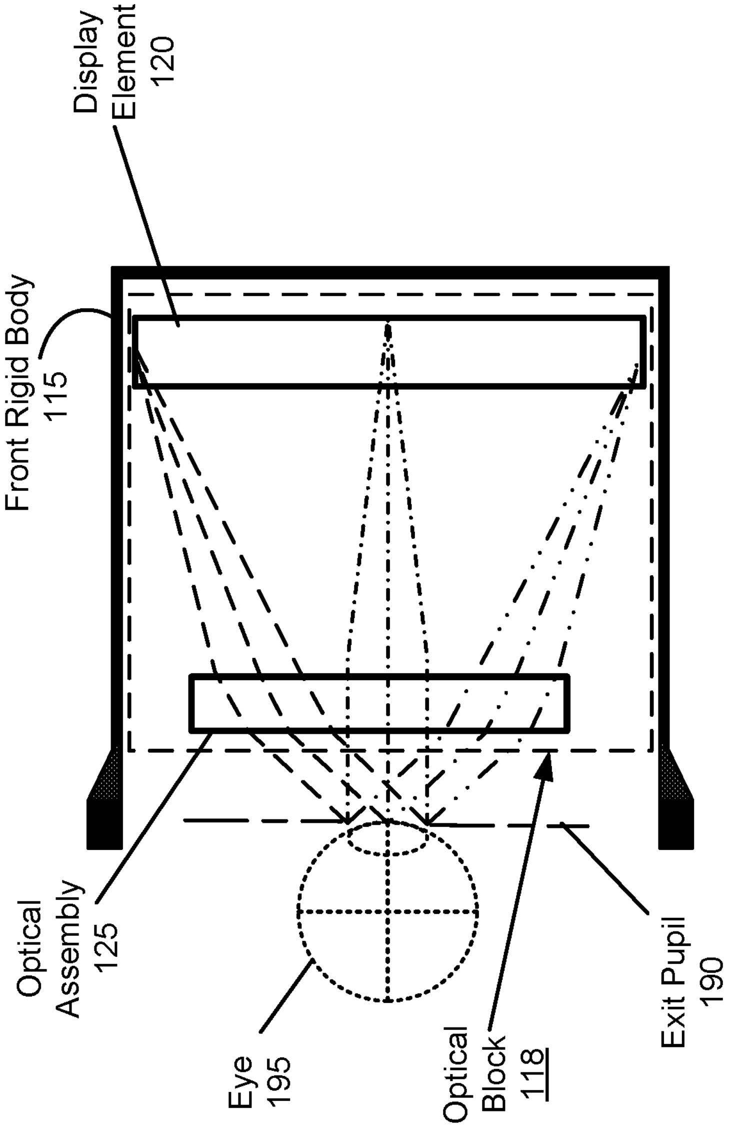
FIG. 1C is a cross section of the front rigid body of the head-mounted display shown in FIG. 1B.

FIG. 1C is a cross section of the front rigid body 115 of the head-mounted display shown in FIG. 1B. As shown in FIG. 1C, the front rigid body 115 includes an optical block 118 that provides altered image light to an exit pupil 190. The exit pupil 190 is the location of the front rigid body 115 where a user's eye 195 is positioned. For purposes of illustration, FIG. 1C shows a cross section associated with a single eye 195, but another optical block, separate from the optical block 118, provides altered image light to another eye of the user.

The optical block 118 includes a display element 120, and the optics block 125. The display element 120 emits image light toward the optics block 125. The optics block 125 magnifies the image light, and in some embodiments, also corrects for one or more additional optical errors (e.g., distortion, astigmatism, etc.). The optics block 125 directs the image light to the exit pupil 190 for presentation to the user.

System Architecture

Figure 2A:
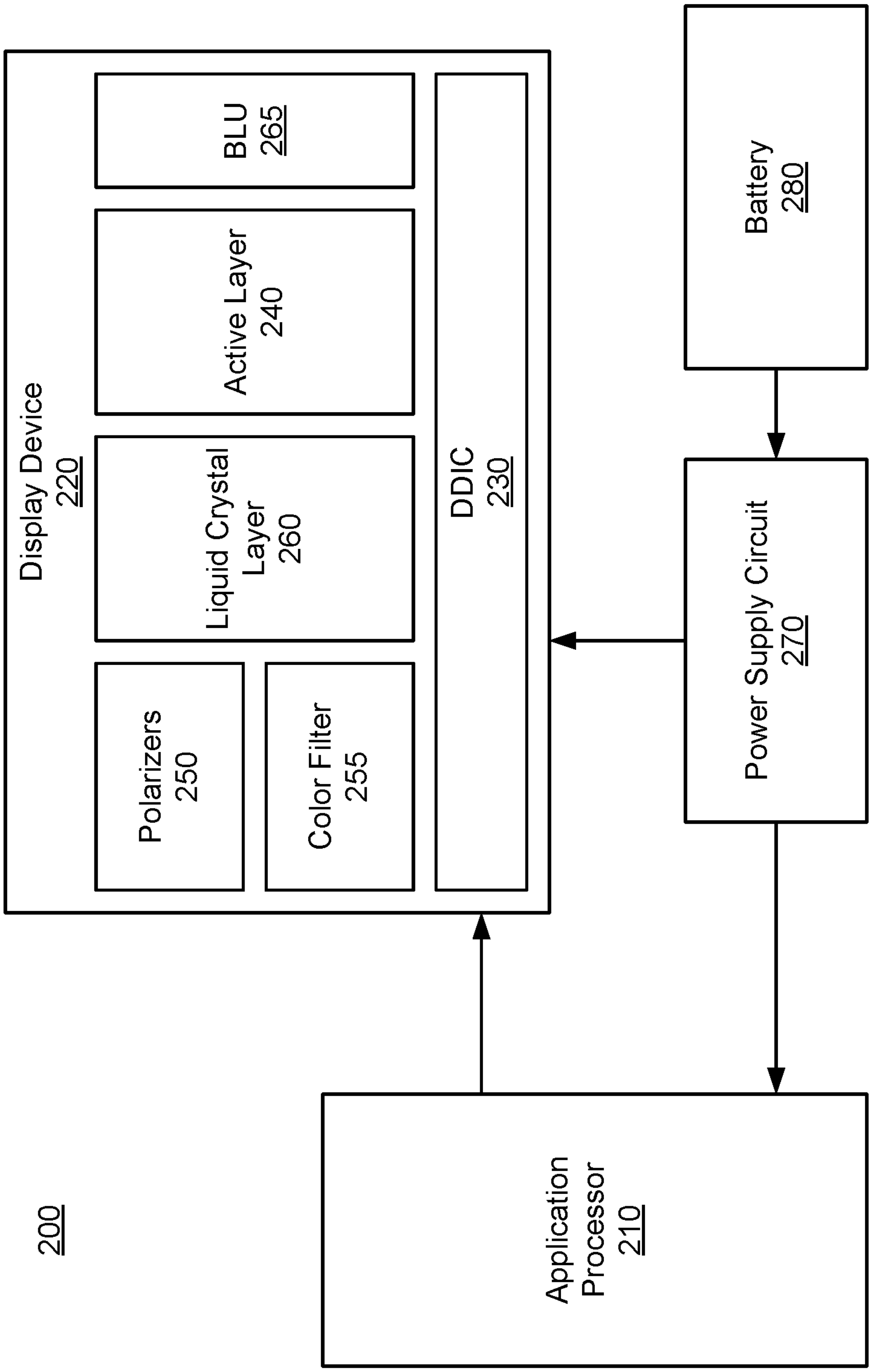
FIG. 2A illustrates a block diagram of an electronic display environment, in accordance with one or more embodiments.

FIG. 2A illustrates a block diagram of an electronic display environment 200, in accordance with one or more embodiments. The electronic display environment 200 includes an application processor 210, and a display device 220. In some embodiments, the electronic display environment 200 additionally includes a power supply circuit 270 for providing electrical power to the application processor 210 and the display device 220. In some embodiments, the power supply circuit 270 receives electrical power from a battery 280. In other embodiments, the power supply circuit 270 receives power from an electrical outlet.

The application processor 210 generates display data for controlling the display device to display a desired image. The display data include multiple pixel data, each for controlling one pixel of the display device to emit light with a corresponding intensity. In some embodiments, each pixel data includes sub-pixel data corresponding to different colors (e.g., red, green, and blue). Moreover, in some embodiments, the application processor 210 generates display data for multiple display frames to display a video.

Figure 2B:
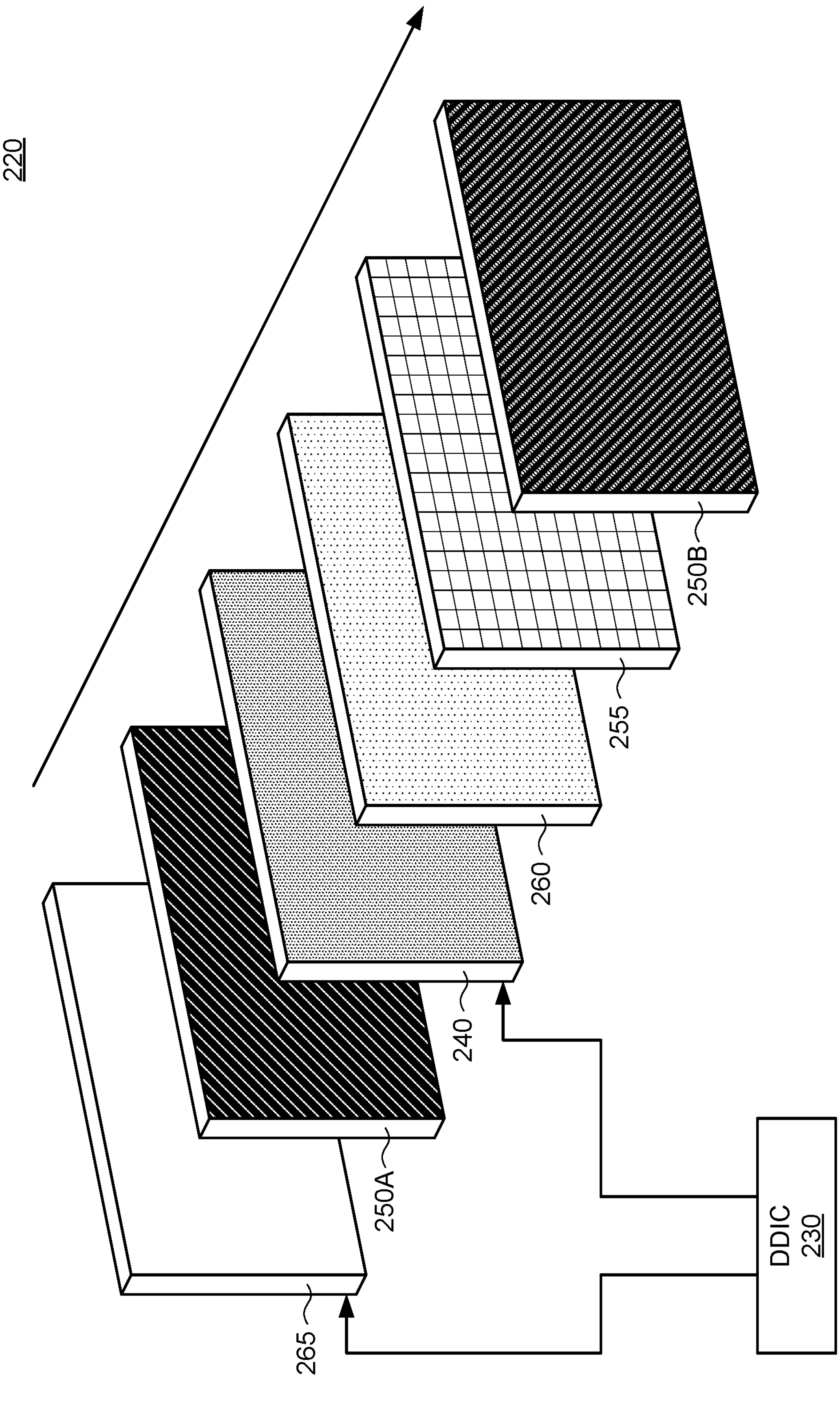
FIG. 2B illustrates a perspective diagram of the elements of the display device, in accordance with one or more embodiments

The display device 220 includes a display driver integrated circuit (DDIC) 230, an active layer 240, a liquid crystal (LC) layer 260, a backlight unit (BLU) 265, polarizers 250, and a color filter 255. The display device 220 may include additional elements, such as one or more additional sensors. In some embodiments, the display device 220 may be an OLED display, micro OLED (uOLED) display, or any suitable display for the electronic display environment 200. The display device 220 may be part of the HMD 100 in FIG. 1A or FIG. 1B. That is, the display device 220 may be an embodiment of the display element 120 in FIG. 1A or FIG. 1C. FIG. 2B illustrates a perspective diagram of the elements of the display device 220, in accordance with one or more embodiments.

The DDIC 230 receives a display signal from the application processor 210, and generates control signals for controlling each pixel 245 in the active layer 240, and the BLU 265. For example, the DDIC 230 generates signals to program each of the pixels 245 in the active layer 240 according to an image signal received from the application processor 210. Moreover, the DDIC 230 generates one or more signals to turn the BLU 265. The DDIC 230 may include one or more gate drivers and one or more source drivers.

The active layer 240 includes a set of pixels 245 organized in rows and columns. For example, the active layer 240 includes N pixels ($P_{11}$ through $P_{1N}$) in the first row, N pixels ($P_{21}$ through $P_{2N}$) in the second row, N pixels ($P_{31}$ through $P_{3N}$) in the third row, and so on. Each pixel includes sub-pixels, each corresponding to a different color. For example, each pixel includes red, green, and blue sub-pixels. In addition, each pixel may include white sub-pixels. Each sub-pixel includes a thin-film-transistor (TFT) for controlling the liquid crystal in the LC layer 260. For example, the TFT of each sub-pixel is used to control an electric field within a specific area of the LC layer to control the crystal orientation of the liquid crystal within the specific area if the LC layer 260.

The LC layer 260 includes a liquid crystal which has some properties between liquids and solid crystals. In particular, the liquid crystal has molecules that may be oriented in a crystal-like way. The crystal orientation of the molecules of the liquid crystal can be controlled or changed by applying an electric field across the liquid crystal. The liquid crystal may be controlled in different way by applying the electric field in different configurations. Schemes for controlling the liquid crystal includes twisted noematic (TN), in-plane switching (IPS), plane line switching (PLS), fringe field switching (FFS), vertical alignment (VA), etc.

Each pixel 245 is controlled to provide a light output that corresponds to the display signal received from the application processor 210. For instance, in the case of an LCD panel, the active layer 240 includes an array of liquid crystal cells with a controllable polarizations state that can be modified to control an amount of light that can pass through the cell.

The BLU 265 includes light sources that are turned on at predetermined time periods to generate light that can pass through each of the liquid crystal cell to produce a picture for display by the display device. The light sources of the BLU 265 illuminate light towards the array of liquid crystal cells in the active layer 240 and the array of liquid crystal cells controls an amount and location of light passing through the active layer 240. In some embodiments, the BLU 265 includes multiple segmented backlight units, each segmented backlight unit providing light sources for a specific region or zone of the active layer 240.

The polarizers 250 filter the light outputted by the BLU 265 based on the polarization of the light. The polarizers 250 may include a back polarizer 250A and a front polarizer 250B. The back polarizer 250A filters the light outputted by the BLU 265 to provide a polarized light to the LC layer 260. The front polarizer 250B filters the light outputted by the LC layer 260. Since the light provided to the LC layer 260 is polarized by the back polarizer 250A, the LC layer controls an amount of filtering of the front polarizer 250B by adjusting the polarization of the light outputted by the back polarizer 250A.

The color filter 255 filters the light outputted by the LC layer 260 based on color. For instance, the BLU 265 generates white light and the color filter 255 filters the white light to output either red, green, or blue light. The color filter 255 may include a grid of red color filters, green color filters, and blue color filters. In some embodiments, the elements of the display device 220 are arranged in a different order. For example, the color filter may be placed between the BLU 265 and the back polarizer 250A, between the back polarizer 250A and the LC layer 260, or after the front polarizer 250B.

Figure 2C:
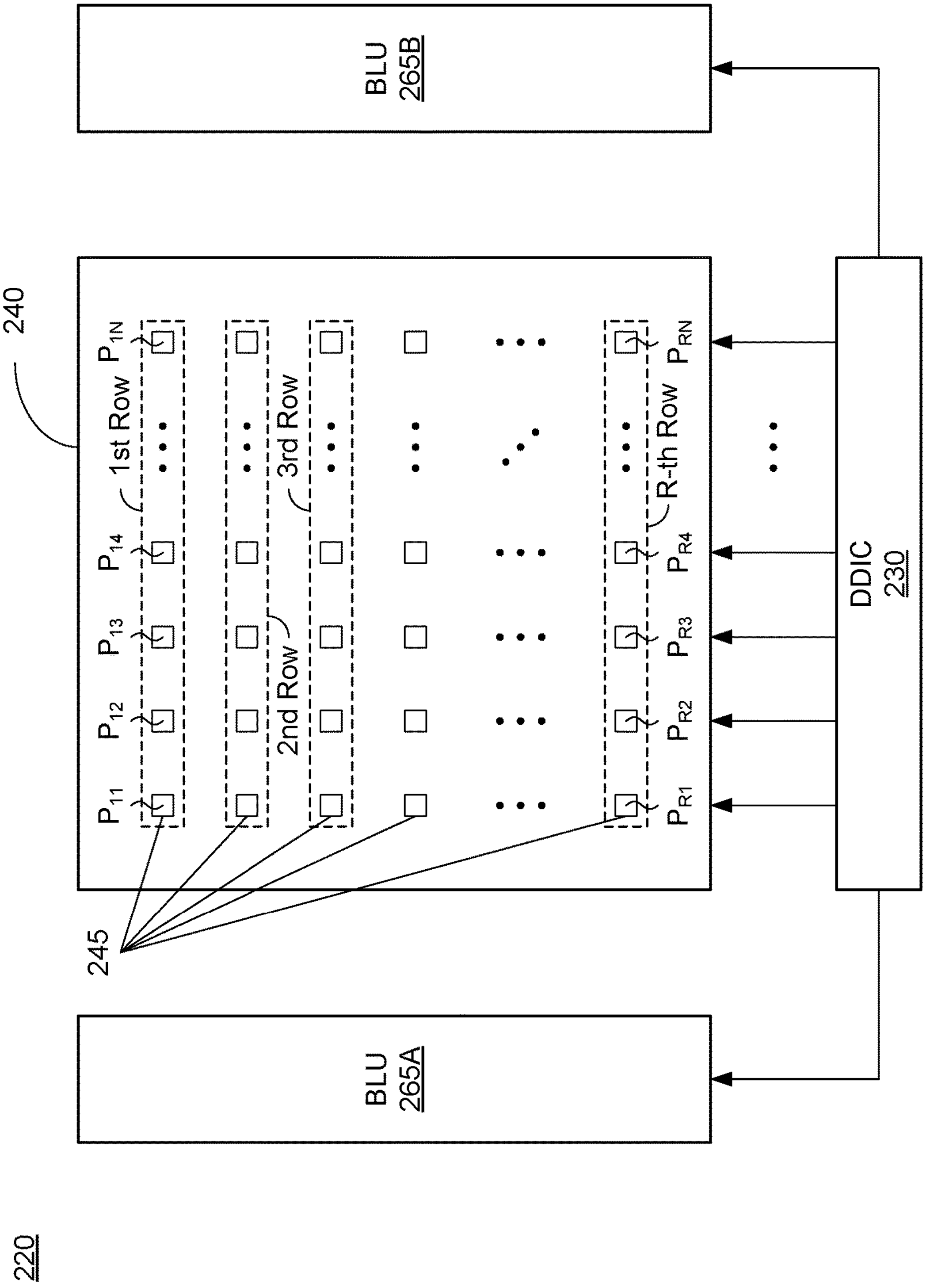
FIG. 2C illustrates an example display device with a two-dimensional array of illumination elements or LC-based pixels, in accordance with one or more embodiments.

FIG. 2C illustrates an example display device 220 with a two-dimensional array of illumination elements or LC-based pixels 245, in accordance with one or more embodiments. In one embodiment, the display device 220 may display a plurality of frames of video content based on a global illumination where all the pixels 245 simultaneously illuminate image light for each frame. In an alternate embodiment, the display device 220 may display video content based on a segmented illumination where all pixels 245 in each segment of the display device 220 simultaneously illuminate image light for each frame of the video content. For example, each segment of the display device 220 may include at least one row of pixels 245 in the display device 220, as shown in FIG. 2C. In the illustrative case where each segment of the display device 220 for illumination includes one row of pixels 245, the segmented illumination can be referred to as a rolling illumination. For the rolling illumination, all pixels 245 in a first row of the display device 220 simultaneously illuminate image light in a first time instant; all pixels 245 in a second row of the display device 220 simultaneously illuminate image light in a second time instant consecutive to the first time instant; all pixels 245 in a third row of the display device 220 simultaneously illuminate image light in a third time instant consecutive to the second time instant, and so on. Other orders of illumination of rows and segments of the display device 220 are also supported in the present disclosure. In yet another embodiment, the display device 220 may display video content based on a controllable illumination where all pixels 245 in a portion of the display device 220 of a controllable size (not shown in FIG. 2C) simultaneously illuminate image light for each frame of the video content. The controllable portion of the display device 220 can be rectangular, square or of some other suitable shape. In some embodiments, a size of the controllable portion of the display device 220 can be a dynamic function of a frame number.

Foveated Display

Figure 3A:
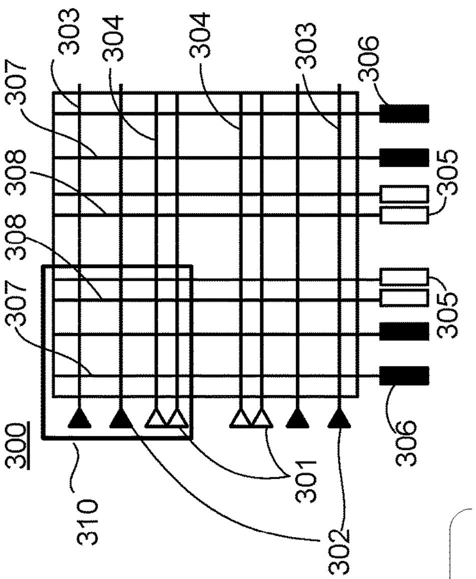
FIGS. 3A-3C illustrate a display array and a corresponding anode layout of a portion of the display array, where low resolution pixels have an anode layout differing from high resolution pixels, in accordance with one or more embodiments.
Figure 3C:
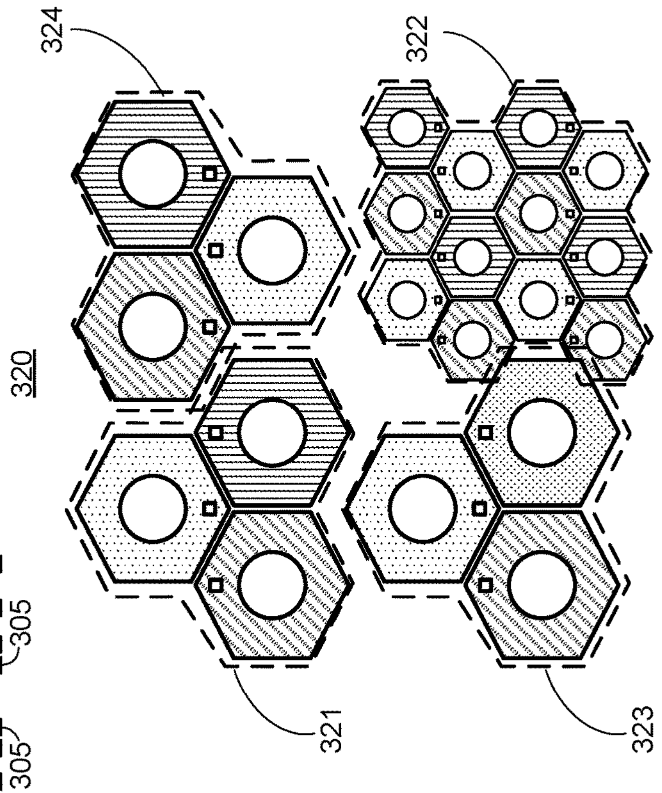
Figure 3B:
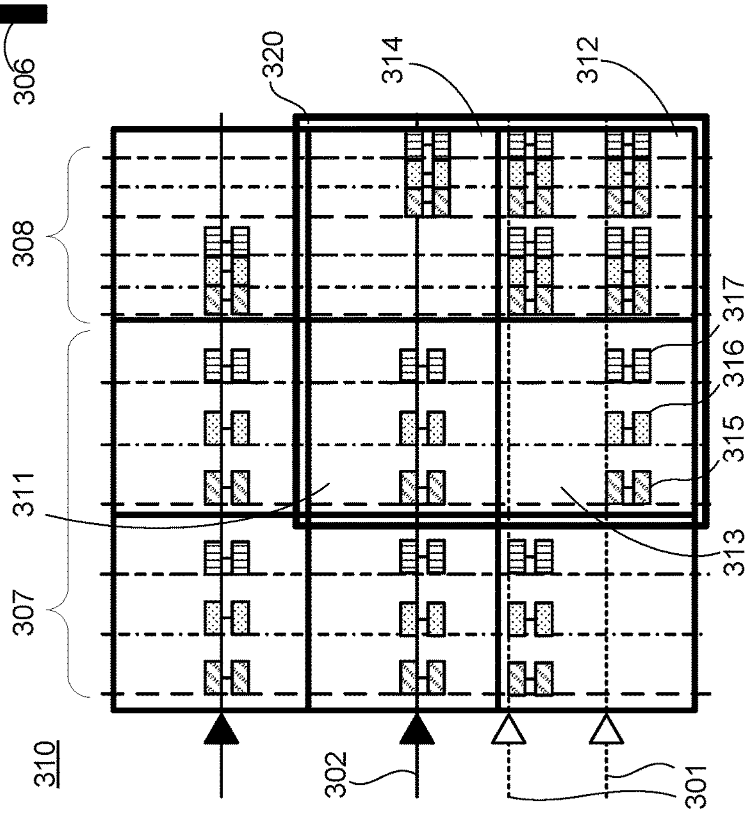

FIGS. 3A-3C illustrate a display array 300 and a corresponding anode layout 320 of a portion 310 of the display array 300, where low resolution pixels have an anode layout differing from high resolution pixels, in accordance with one or more embodiments. FIG. 3A illustrates the display array 300 having an array of pixels disposed on a substrate of a display device (e.g., the display device 220). The pixels include a first set of pixels having a first resolution (e.g., a low resolution) and a second set of pixels having a second resolution (e.g., a high resolution). For convenience, the high resolution gate drivers and source drivers are depicted using a first shading in FIGS. 3A-5C and the low resolution gate drivers and source drivers are depicted using a second shading in FIGS. 3A-5C.

The display array 300 includes gate drivers 301 and 302 that provide scan signals to the pixels. The gate drivers 301 transmit scan signals to pixels, including pixels having a high resolution through high resolution scan lines 304. The gate drivers 301 may also transmit scan signals to pixels having a low resolution through the high resolution scan lines 304. The gate drivers 302 transmit scan signals to pixels having a low resolution through low resolution scan lines 303. The display array 300 further includes source drivers 305 and 306. The source drivers 305 are connected to pixels having a high resolution. The source drivers 306 are connected to pixels having a low resolution. The source drivers 306 transmit display data to pixels using low resolution data lines 307. This display data may be referred to herein as low pixel per inch (PPI) data. The source drivers 305 transmit display data to pixels using high resolution data lines 308. The high resolution data lines 308 may be connected to both pixels having low resolution and pixels having high resolution. The display data transmitted using the high resolution data lines 308 may be referred to herein as high PPI data. In other embodiments, a display array may have high and/or low resolution gate drivers located at different rows. Similarly, a display array may have high and/or low resolution source drivers located and different columns. In other embodiments, a display array may have a different number of low resolution and/or high resolution scan lines or source drivers.

FIG. 3B illustrates a portion 310 of the display array 300 of FIG. 3A. The portion 310 of the display array 300 includes pixel cells 311, 312, 313, and 314. In the embodiment of FIG. 3B, the pixel cells 311, 313, and 314 each include circuitry for one pixel and the pixel cell 312 includes circuitry for four pixels. Each pixel includes red, green, and blue (RGB) subpixels, which are denoted through different stippling in FIGS. 3A-5C. For example, a red subpixel 315, a green subpixel 316, and a blue subpixel 317 of the pixel cell 313 have three respective types of stippling that are used throughout FIGS. 3A-5C to denote the three different colors. Each subpixel, including subpixels 315-317, may include a driving transistor and a switching transistor. Each subpixel may include additional, fewer, or alternative components (e.g., a select transistor, emission transistors, etc.).

The pixel cells 311, 313, and 314 may be included within a first set of pixels having a low resolution. The cell layouts of the pixel cells 311, 313, and 314 are embodiments of low resolution cell layouts. Cell layouts may also be referred to herein as "pixel cell layouts." The pixel cells 311, 313, and 314 each include three driving transistors and three switch transistors. In the embodiment shown in FIGS. 3B and 3C, each pixel cell 311, 313, and 314 consist of one pixel. The presence of only one pixel contributes to the pixels providing a low resolution display. The cell layout of the pixel cell 311 includes a low resolution scan line 302 and low resolution display lines 307 connected to a pixel. The cell layout of the pixel cell 313 includes high resolution scan lines 301 and low resolution display lines 307. A pixel of the pixel cell 313 is connected to one of the high resolution scan lines 301 and to the low resolution display lines 307. The other high resolution scan lines 301 is not connected to a pixel of the pixel circuit 313. The cell layout of the pixel cell 314 includes a low resolution scan line 302 and high resolution display lines 308. The low resolution scan line 302 is connected to a pixel of the pixel cell 314. One set of the high resolution display lines 308 through the pixel cell 314 is connected to a pixel of the pixel circuit 314 while another set of the high resolution display lines 308 is not connected to the pixel. In some embodiments, although not depicted in FIG. 3B, the pixel cells 311 and 314 may include two low resolution scan lines, where one of the two low resolution scan lines is not connected to a pixel.

The pixel cell 312 may be included within a second set of pixels having a high resolution. The pixel cell 312 may include an array of multiple pixels. As depicted in FIG. 3B, the pixel cell 312 contains a 2×2 array of pixels. The pixel cell 312 includes two high resolution scan lines 301 and high resolution display lines 308. Each high resolution scan line 301 within the pixel cell 312 is connected to two pixels. Each high resolution display line 308 is also connected to two pixels. The pixel cell 312 may include twelve driving transistors and twelve switch transistors. The display data provided to each subpixel of the pixel cell 312 may be independent of data provided to other subpixels. The variety of display data values that may be displayed at the pixel cell 312 contributes the high resolution of the pixel cell 312 relative to the pixel cells 311, 313, and 314. In alternative embodiments of low resolution cell layouts depicted in FIGS. 4B and 5B, the low resolution cell layouts may include arrays of multiple pixels (e.g., 2×1 or 1×2) that provide a low resolution display due to the same display data displayed at multiple pixels within the cell, where the multiple pixels may be driven by gate drivers at the same time. Additional embodiments of low resolution pixels are further described in the description of FIGS. 4B and 5B. Being formed in a foveated manner with a combination of low and high resolution pixels, the display array 300 may have a reduced power consumption as compared to a display array with a greater number of high resolution pixels.

FIG. 3C illustrates anode layouts for pixel cells of a portion 320 of the display array 300. The pixel cells 311, 313, and 314 can include respective sets of anodes 321, 323, and 324 formed in a first anode layout. The first anode layout may include one anode for each respective RGB subpixel. Each anode may be hexagonal in shape. Shapes of anodes described herein are not limited to being hexagonal in shape. Anodes may be shaped in any suitable shape. Similarly, the anode layout may include additional pixels, fewer pixels, differently shaped pixels, or any suitable combination thereof. The pixel cell 312 can include a set of anodes 322 formed in a second anode layout. The second anode layout includes anodes for four pixels (i.e., four red anodes, four green anodes, and four blue anodes). The second anode layout may correspond to four high resolution pixels while the first anode layout may correspond to one low resolution pixel. A low resolution pixel may be formed using fewer anodes than a high resolution pixel. For example, the low resolution pixels can be formed in the first anode layout, which consists of three anodes, and the high resolution pixels can be formed in the second anode layout, which consists of twelve anodes. Although the sets of anodes 321-324 are depicted with space between each set to promote clarity in the figure, the sets of anodes 321-324 may be disposed closer to one another.

Figure 4A:
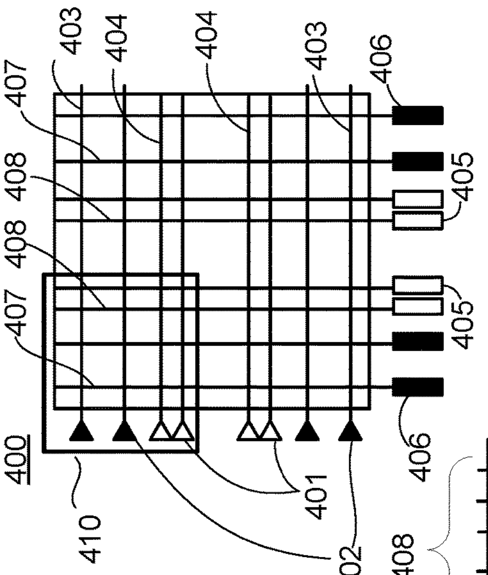
FIGS. 4A-4C illustrate a display array and a corresponding anode layout of a portion of the display array, where low resolution pixels have one of multiple anode layouts, in accordance with one or more embodiments.
Figure 4C:
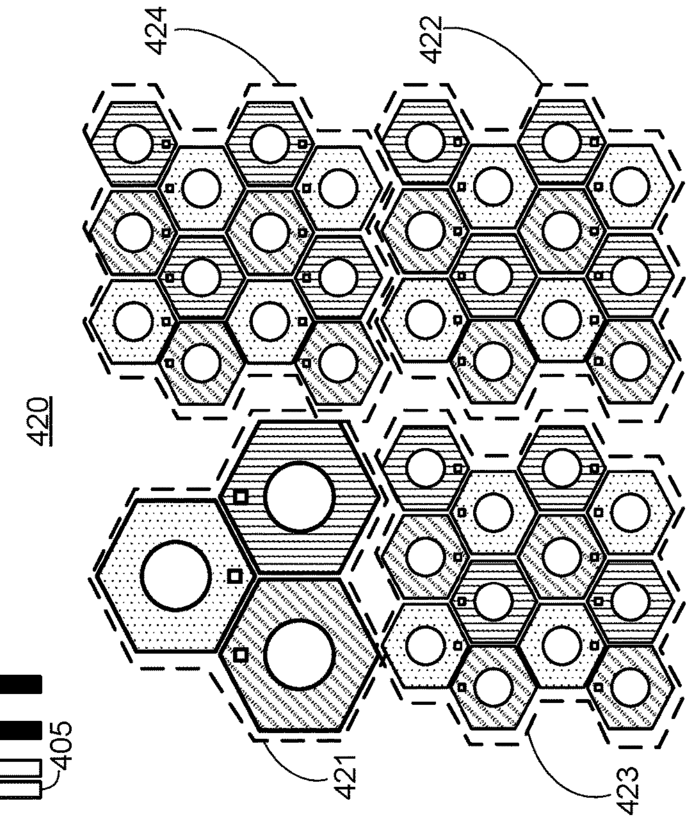
Figure 4B:
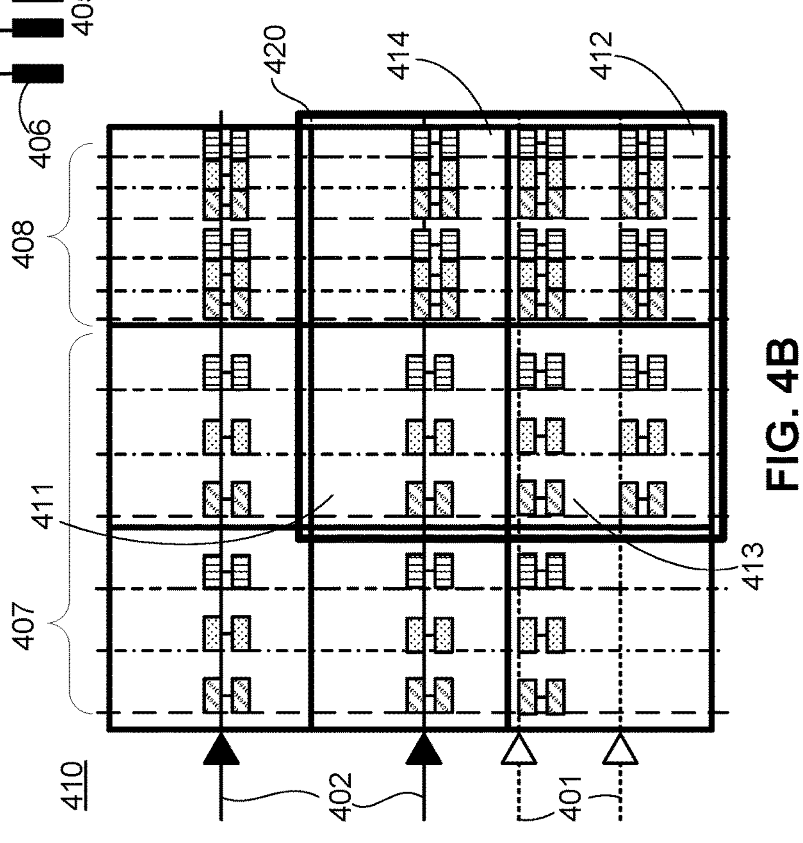

FIGS. 4A-4C illustrate a display array 400 and a corresponding anode layout 420 of a portion 410 of the display array 400, where low resolution pixels have one of multiple anode layouts, in accordance with one or more embodiments. FIG. 4A illustrates the display array 400 having an array of pixels disposed on a substrate of a display device (e.g., the display device 220). The pixels include a first set of pixels having a first resolution (e.g., a low resolution) and a second set of pixels having a second resolution (e.g., a high resolution).

The display array 400 includes gate drivers 401 and 402. The gate drivers 401 transmit scan signals to pixels having a high resolution through high resolution scan lines 404. The gate drivers 402 transmit scan signals to pixels having a low resolution through low resolution scan lines 403. The display array 400 further includes source drivers 405 and 406. The source drivers 405 are connected to pixels having a high resolution. The source drivers 406 are connected to pixels having a low resolution. The source drivers 406 transmit display data to pixels using low resolution data lines 407. The source drivers 405 transmit display data to pixels using high resolution data lines 408. In other embodiments, a display array may have high and/or low resolution gate drivers located at different rows. Similarly, a display array may have high and/or low source drivers located and different columns. In other embodiments, a display array may have a different number of low resolution and/or high resolution scan lines or source drivers.

FIG. 4B illustrates a portion 410 of the display array 400 of FIG. 4A. The portion 410 of the display array 400 includes pixel cells 411, 412, 413, and 414. In the embodiment of FIG. 4B, the pixel cell 411 includes circuitry for one pixel, the pixel cells 413 and 414 each include circuitry for two pixels, and the pixel cell 412 includes circuitry for four pixels. Each pixel includes RGB subpixels. Each subpixel may include a driving transistor and a switching transistor. Each subpixel may include additional, fewer, or alternative components (e.g., a select transistor, emission transistors, etc.).

The pixel cells 411, 413, and 414 may be included within a first set of pixels having a low resolution. The cell layouts of the pixel cells 411, 413, and 414 are embodiments of low resolution cell layouts. The pixel cell 411 includes three driving transistors and three switch transistors. The pixel cells 413 and 414 each include six driving transistors and six switch transistors. In some embodiments, two driving transistors may be driven simultaneously (e.g., two red subpixel driving transistors may be driven by the same scan signal transmitted through both scan lines of the pixel cell 413). The cell layout of the pixel cell 411 includes a low resolution scan line 402 and high resolution display lines 407 connected to a pixel. The cell layout of the pixel cell 413 includes high resolution scan lines 401 and low resolution display lines 407. The two pixels within the pixel cell 413 are connected to respective high resolution scan lines 401. Within the pixel cell 413, the low resolution display lines 407 are connected to both pixels. The cell layout of the pixel cell 414 includes a low resolution scan line 402 and high resolution display lines 408. The low resolution scan line 402 is connected to two pixels of the pixel cell 414. In some embodiments, although not depicted in FIG. 4B, the pixel cells 411 and 414 may include two low resolution scan lines, where one of the two low resolution scan lines is not connected to a pixel.

The embodiments of pixel cells 413 and 414, which are low resolution cell layouts, include arrays of multiple pixels (e.g., 2×1 or 1×2). These low resolution cell layouts can, for example, provide a low resolution display due to the same display data displayed at multiple pixels within the cell, where the multiple pixels may be driven by gate drivers at the same time. For example, the two high resolution scan lines 401 of the pixel cell 413 may be driven simultaneously so that two pairs of subpixels in the same column display the same data value simultaneously. In another example, via the cell 414, the display device may transmit the same display data across different sets of high resolution display lines 408 to be driven together by a single low resolution line 402.

The pixel cell 412 may be included within a second set of pixels having a high resolution. The pixel cell 412 may include an array of multiple pixels. As depicted, the pixel cell 412 is a 2×2 array of pixels. The cell layout of the pixel cell 412 includes two high resolution scan lines 401 and high resolution display lines 408. Each high resolution scan line 401 within the pixel cell 412 is connected to two pixels. Each high resolution display line 408 is also connected to two pixels. The pixel cell 412 may include twelve driving transistors and twelve switch transistors. The display data provided to each subpixel of the pixel cell 412 may be independent of data provided to other subpixels. The variety of display data values that may be displayed at the pixel cell 412 contributes the high resolution of the pixel cell 412 relative to the pixel cells 411, 413, and 414. Being formed in a foveated manner with a combination of low and high resolution pixels, the display array 400 may have a reduced power consumption as compared to a display array with a greater number of high resolution pixels.

FIG. 4C illustrates anode layouts for pixel cells of a portion 420 of the display array 400. The pixel cell 411 can include a set of anodes 421 formed in a first anode layout. The first anode layout may include one anode for each respective RGB subpixel. Each anode of sets of anodes 421-424 may be hexagonal in shape. The pixel cell 412 can include a set of anodes 422 formed in a second anode layout. The second anode layout includes anodes for four pixels (i.e., four red anodes, four green anodes, and four blue anodes). The second anode layout may correspond to four high resolution pixels while the first anode layout may correspond to one low resolution pixel. The pixel cell 413 can include a set of anodes 423 formed in a second anode layout. However, not all of the anodes of the second anode layout, as instantiated for the set of anodes 423, may be driven. This may enable the pixel cell 413 to provide a low resolution display. That is, the pixel cell 413 includes two pixels and anodes for four pixels; the anodes for two out of the four pixels may be unused. Similarly, the pixel cell 414 can include a set of anodes 424 formed in a second anode layout. Not all of the anodes of the second anode layout, as instantiated for the set of anodes 424, may be driven by the gate drivers 401. The pixel cell 414 includes two pixels and anodes for four pixels; the anodes for two out of the four pixels may be unused. Although the sets of anodes 421-424 are depicted with space between each set to promote clarity in the figure, the sets of anodes 421-424 may be disposed closer to one another on a substrate.

Figure 5A:
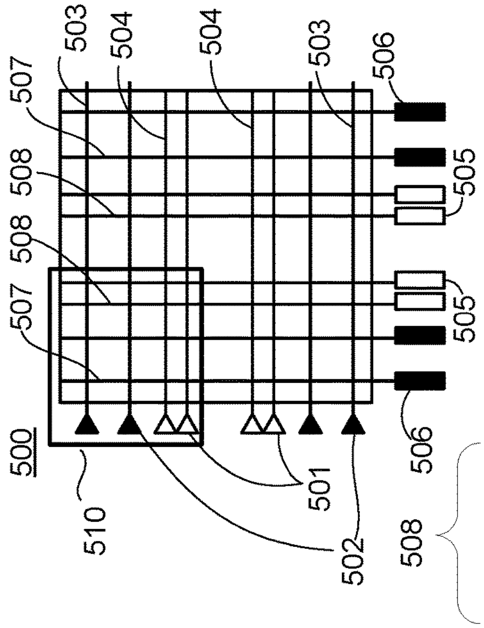
FIGS. 5A-5C illustrate a display array and a corresponding anode layout of a portion of the display array, where low resolution pixels have the same anode layout as high resolution pixels, in accordance with one or more embodiments.
Figure 5B:
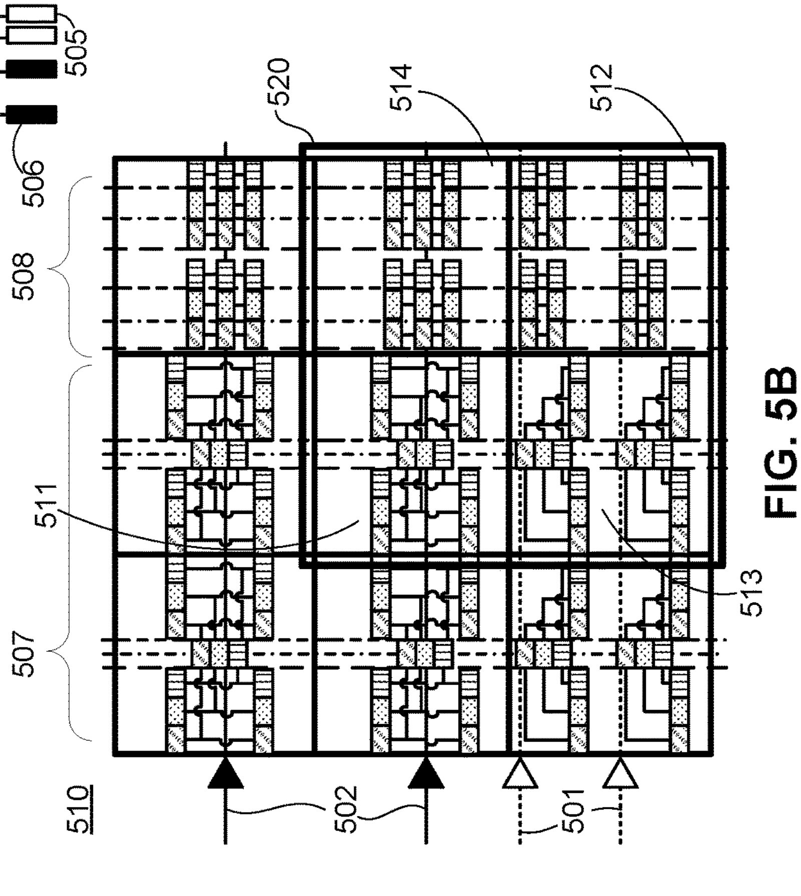
Figure 5C:
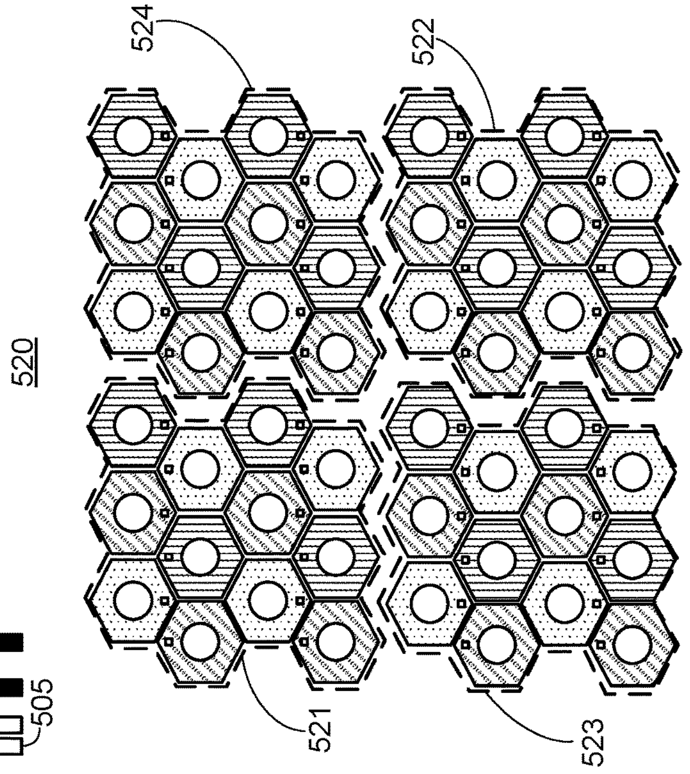

FIGS. 5A-5C illustrate a display array 500 and a corresponding anode layout 520 of a portion 510 of the display array 500, where low resolution pixels have the same anode layout as high resolution pixels in accordance with one or more embodiments. FIG. 5A illustrates the display array 500 having an array of pixels disposed on a substrate of a display device (e.g., the display device 220). The pixels include a first set of pixels having a first resolution (e.g., a low resolution) and a second set of pixels having a second resolution (e.g., a high resolution).

The display array 500 includes gate drivers 501 and 502 that provide scan signals to the pixels. The gate drivers 501 transmit scan signals to pixels having high resolution through high resolution scan lines 504. The gate drivers 502 transmit scan signals to pixels having low resolution through low resolution scan lines 503. The display array 500 further includes source drivers 505 and 506. The source drivers 505 are connected to pixels having a high resolution. The source drivers 506 are connected to pixels having a low resolution. The source drivers 506 transmit display data to pixels using low resolution data lines 507. The source drivers 505 transmit display data to pixels using high resolution data lines 508. In other embodiments, a display array may have high and/or low resolution gate drivers located at different rows. Similarly, a display array may have high and/or low source drivers located and different columns. In other embodiments, a display array may have a different number of low resolution and/or high resolution scan lines or source drivers.

FIG. 5B illustrates a portion 510 of the display array 500 of FIG. 5A. The portion 510 of the display array 500 includes pixel cells 511, 512, 513, and 514. In the embodiment of FIG. 5B, the pixel cells 511-514 include circuitry for four pixels. Each pixel includes RGB subpixels. Each subpixel may include a driving transistor and a switching transistor. In the embodiment shown in FIG. 5B, multiple driving transistors may be connected to the same switching transistor. For example, the driving transistors of four different red subpixels are connected to one switching transistor, which is connected to one low resolution scan line 502 and a display data line 507. In another example, the driving transistors of two different green subpixels are connected to one switching transistor, which is connected to one high resolution scan line 501 and a display data line 507. Each subpixel may include additional, fewer, or alternative components (e.g., a select transistor, emission transistors, etc.).

The pixel cells 511, 513, and 514 may be included within a first set of pixels having a low resolution. The cell layouts of the pixel cells 511, 513, and 514 are embodiments of low resolution cell layouts. The pixel cell 511 includes twelve driving transistors and three switch transistors. The pixel cells 513 and 514 each include twelve driving transistors and six switch transistors. In some embodiments, multiple driving transistors (e.g., up to four) may be driven simultaneously (e.g., two red subpixel driving transistors may be driven by the same scan signal transmitted through both scan lines of the pixel cell 513). The cell layout of the pixel cell 511 includes a low resolution scan line 502 and high resolution display lines 507 connected to four pixels. The cell layout of the pixel cell 513 includes high resolution scan lines 501 and low resolution display lines 507. Each high resolution scan line 501 is connected to two pixels within the pixel cell 513. Within the pixel cell 513, the low resolution display lines 507 are connected to all pixels. The cell layout of the pixel cell 514 includes a low resolution scan line 502 and high resolution display lines 508. The low resolution scan line 502 is connected to the four pixels of the pixel cell 514. In some embodiments, although not depicted in FIG. 5B, the pixel cells 511 and 514 may include two low resolution scan lines, where one of the two low resolution scan lines is not connected to a pixel.

The low resolution cell layouts of pixel cells 511, 513, and 514 can, for example, provide a low resolution display due to the same display data displayed at multiple pixels within the cell, where the multiple pixels may be driven by gate drivers at the same time. For example, the two high resolution scan lines 501 of the pixel cell 513 may be driven simultaneously so that two pairs of subpixels display the same data value simultaneously. In another example, via the cell 514, the display device may transmit the same display data across different sets of high resolution display lines 508 to be driven together by a single low resolution line 502.

The pixel cell 512 may be included within a second set of pixels having a high resolution. The pixel cell 512 may include an array of multiple pixels. As depicted, the pixel cell 512 is a 2×2 pixel cell. The cell layout of the pixel cell 512 includes two high resolution scan lines 501 and high resolution display lines 508. Each high resolution scan line 501 within the pixel cell 512 is connected to two pixels. Each high resolution display line 508 is also connected to two pixels. The pixel cell 512 may include twelve driving transistors and twelve switch transistors. The display data provided to each subpixel of the pixel cell 512 may be independent of data provided to other subpixels. The variety of display data values that may be displayed at the pixel cell 512 contributes the high resolution of the pixel cell 512 relative to the pixel cells 511, 513, and 514. Being formed in a foveated manner with a combination of low and high resolution pixels, the display array 500 may have a reduced power consumption as compared to a display array with a greater number of high resolution pixels.

FIG. 5C illustrates anode layouts for pixel cells of a portion 520 of the display array 500. The pixel cells 511-514 can include respective sets of anodes 521-524 formed in the same anode layout (e.g., the second anode layout as described with respect to FIGS. 3C and 5C). Each anode of sets of anodes 521-524 may be hexagonal in shape. The anode layout includes anodes for four pixels (i.e., four red anodes, four green anodes, and four blue anodes). The anode layout may correspond to four high resolution pixels. Although the sets of anodes 521-524 are depicted with space between each set to promote clarity in the figure, the sets of anodes 521-524 may be disposed closer to one another on a substrate.

Figure 6B:
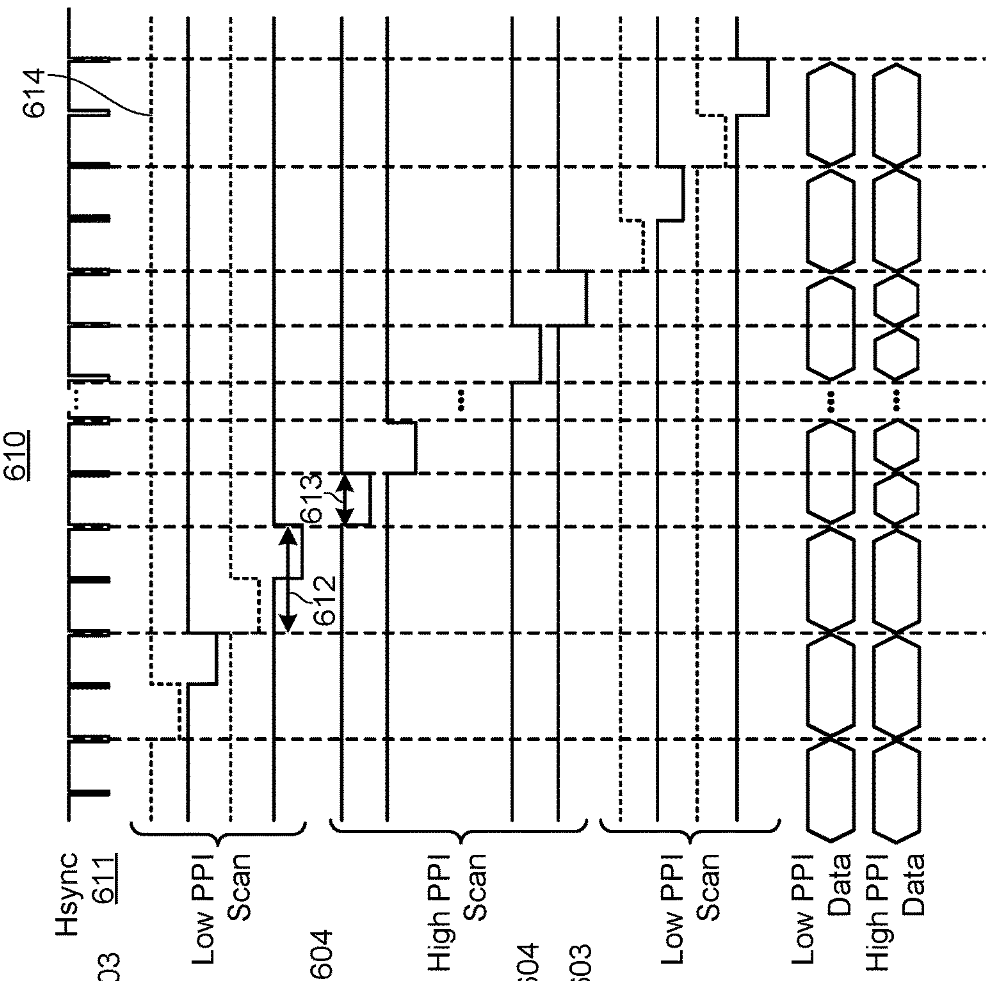
FIGS. 6A-6B illustrates a gate driver timing diagram with varying row scan times for a driving configuration of a display array, in accordance with one or more embodiments.
Figure 6A:
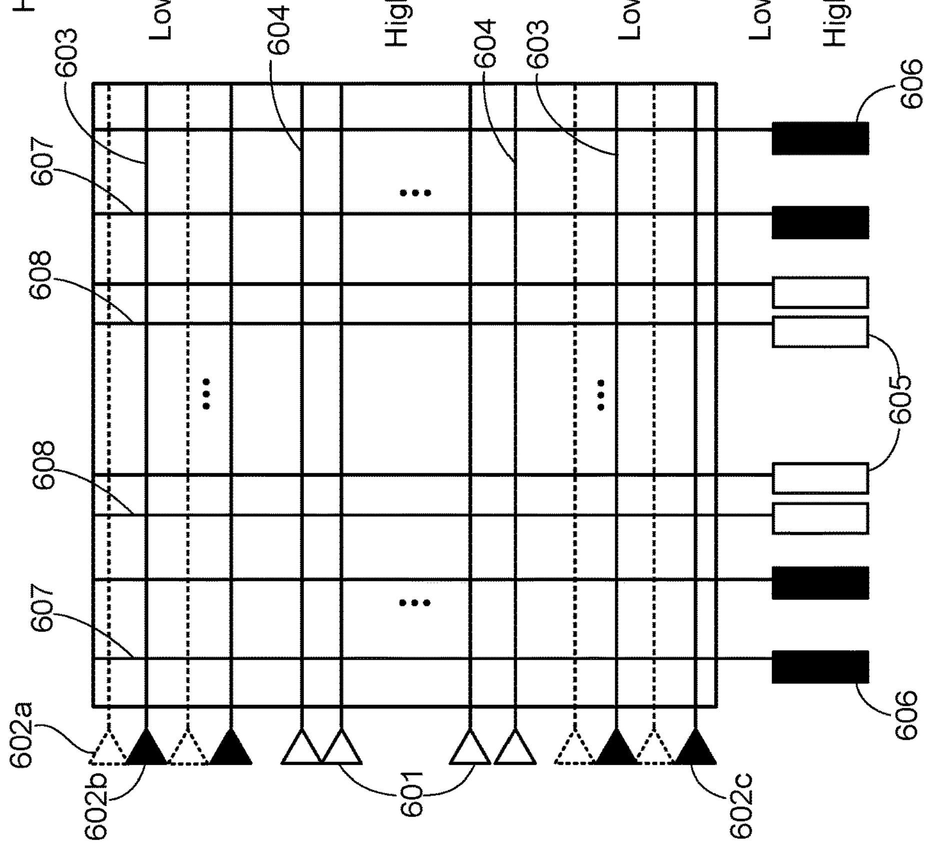

FIGS. 6A-6B illustrates a gate driver timing diagram 610 with varying row scan times for a driving configuration of a display array 600, in accordance with one or more embodiments. The driving configuration includes different row scan times for different resolutions. In some embodiments, low resolution pixels may have a first row scan time (e.g., a low resolution row scan time 612) and high resolution pixels may have a second row scan time (i.e., a high resolution row scan time 613). In one example, the low resolution row scan time 612 is twice the duration of the high resolution row scan time 613.

The timing diagram 610 shows the scan signals for high resolution scan lines 601 and low resolution scan lines 602 of the display array 600. High resolution display drivers 605 can provide high resolution data (i.e., high PPI data) and low resolution display drivers 606 can provide low resolution data (i.e., low PPI data) to the pixels of the display array 600. The high resolution display drivers 605 may also provide low PPI data. An Hsync signal 611 shows a frequency at which each row can be sequentially driven. Scan signals of the gate driver timing diagram 610 are depicted to be aligned with respective scan lines of the display array 600. For example, the scan signal 614 is depicted in line with a corresponding scan line driven by the gate driver 602*a*. In FIGS. 6A-6B, the dashed gate driver, scan line, and corresponding scan signal indicate that the scan signal is passing through the gate driver and scan line, but no pixel is being driven. This concept is represented in pixel layouts of low resolution pixel cells like pixel cells 311, 313, 314, 411, 414, 511, or 514. The dashed components may, in some embodiments, be omitted from the display array 600 and the timing diagram 610. In such embodiments, the low PPI scan signal may be generated from a single gate driver (e.g., the gate driver 602*b*). In some embodiments, one or more pixels of these pixel cells are connected to only one scan line. In some embodiments, the pixel cells 311, 313, 314, 411, 414, 511, and 514 may include multiple scan lines; however, only one scan line of each pixel cell may drive one or more pixels. The scan lines that may be present but are not driving a pixel are represented in FIG. 6 through short dashes.

The low resolution row scan time 612 may be twice as large as high resolution row scan time 613. This difference in duration may be caused by a number of unused low resolution scan lines. Although a low resolution scan line may be driven by the same high duration of the Hsync signal 611 as a high resolution scan line, a total time needed to scan a low resolution scan line of a cell may be longer to account for the time needed to drive a row within the cell that is not connected a pixel within the cell. The high resolution row scan time 613 may be consistent with the duration of the high of Hsync signal 611.

Figure 7A:
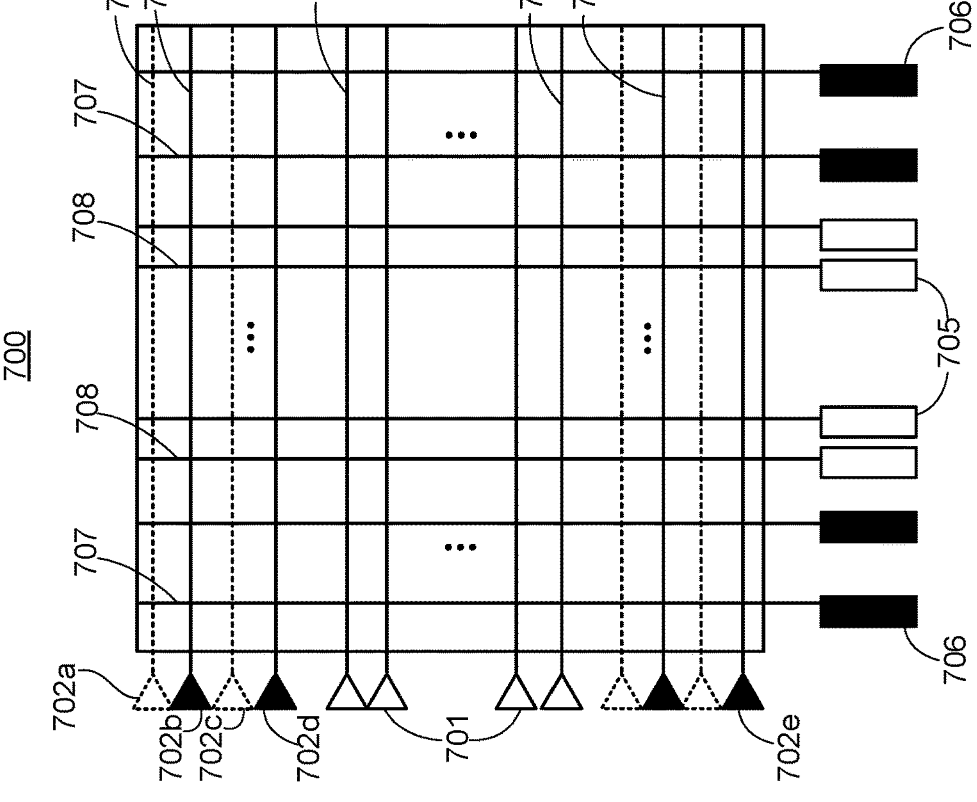
FIGS. 7A-7B illustrates a gate driver timing diagram with consistent row scan times for a driving configuration of a display array, in accordance with one or more embodiments, in accordance with one or more embodiments.
Figure 7B:
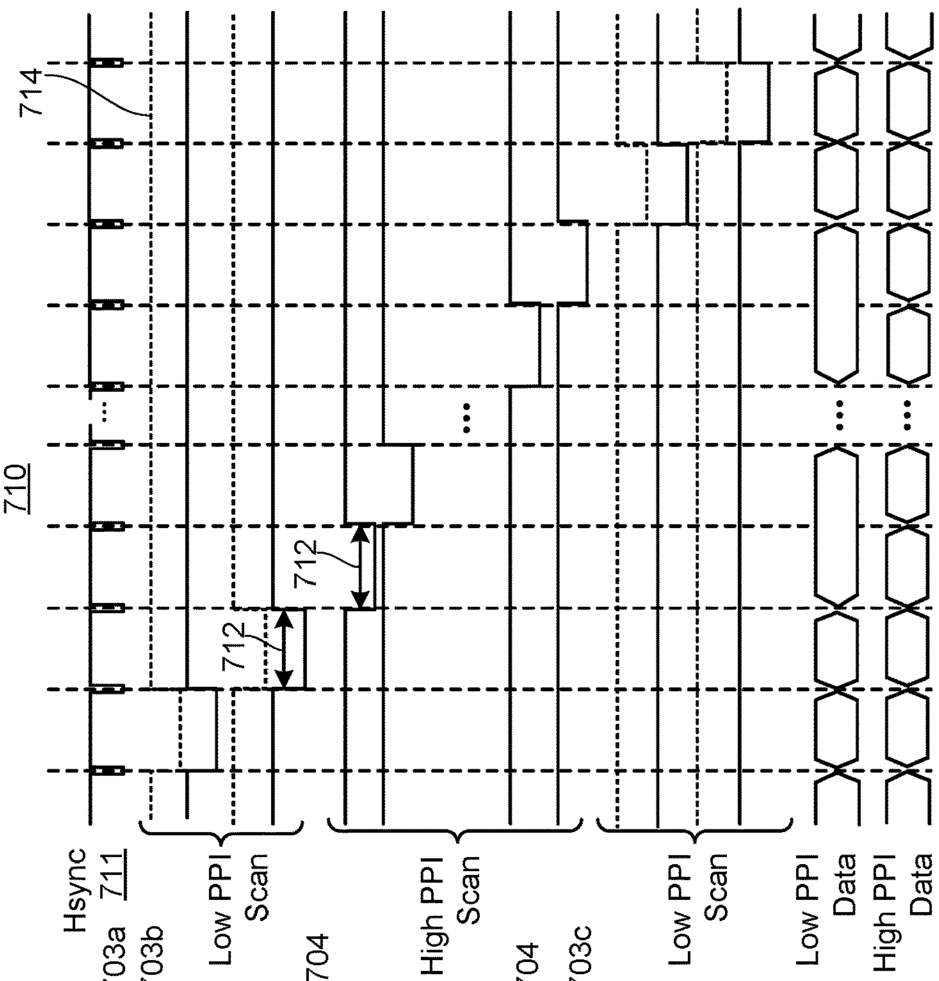

FIGS. 7A-7B illustrates a gate driver timing diagram 710 with consistent row scan times for a driving configuration of a display array 700, in accordance with one or more embodiments. The driving configuration includes the same row scan time for different resolutions. In some embodiments, low resolution pixels and high resolution pixels may have a row scan time 712.

The timing diagram 710 shows the scan signals for high resolution scan lines 701 and low resolution scan lines 702 of the display array 700. High resolution display drivers 705 can provide high resolution data (i.e., high PPI data) and low resolution display drivers 706 can provide low resolution data (i.e., low PPI data) to the pixels of the display array 700. An Hsync signal 711 shows a frequency at which each row can be sequentially driven. Scan signals of the gate driver timing diagram 710 are depicted to be aligned with respective scan lines of the display array 700. For example, the scan signal 714 is depicted in line with a corresponding scan line driven by the gate driver 702*a*. In FIGS. 7A-7B, the dashed gate driver, scan line, and corresponding scan signal indicate that the scan signal is passing through the gate driver and scan line, but no pixel is being driven. This concept is represented in pixel layouts of low resolution pixel cells like pixel cells 311, 313, 314, 411, 414, 511, or 514. In some embodiments, one or more pixels of these pixel cells are connected to only one scan line. In some embodiments, the pixel cells 311, 313, 314, 411, 414, 511, and 514 may include multiple scan lines; however, only one scan line of each pixel cell may drive one or more pixels. The scan lines that may be present but are not driving a pixel are represented in FIGS. 7A-7B through short dashes.

The low resolution row scan time and the high resolution row scan time may be the same row scan time 712. In contrast with the driving configuration depicted in FIGS. 6A-6B, the driving configuration of FIGS. 7A-7B is achieved by bypassing gate drivers. In particular, the low resolution gate drivers 702 (e.g., the drivers 702*a*-702*e*) may be connected such that gate drivers are effectively skipped (or bypassed) if their corresponding scan lines are not connected to a pixel. For example, the scan signal output from the gate driver 702*b* may be coupled to only the gate driver 702*d* or to both gate drivers 702*c* and 702*d*. As a result, the gate driver 702*d* is driven after the gate driver 702*b* is driven. This effectively bypasses the gate driver 702*c*, which is not connected to a pixel. In some embodiments, gate drivers 702*a* and 702*c* (and other gate drivers depicted using dashed lines) are omitted from the display array 700.

The driving configuration of FIGS. 7A-7B may provide an increased row scan timing margin as compared to the driving configuration of FIGS. 6A-6B. For example, the driving configuration of FIGS. 7A-7B may effectively scan a fewer number of rows than scanned according to the driving configuration of FIGS. 6A-6B. By scanning a fewer number of rows, the row scan timing margin, which may be calculated by dividing the row scan time by the number of rows, increases. In some embodiments, the row scan time 712 may be the same as the row scan time 613. That is, the high duration of the Hsync signal 611 may be equivalent to the high duration of the Hsync signal 711.

Figure 8:
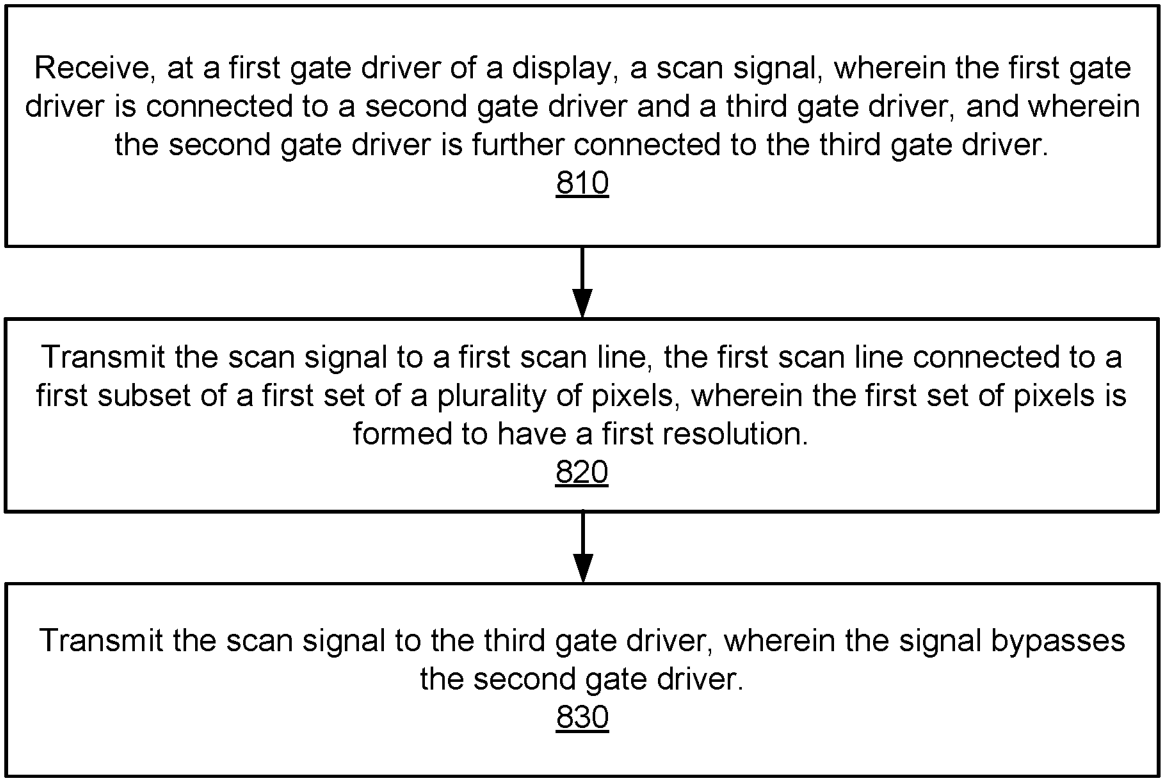
FIG. 8 is a process for driving a display array, in accordance with one or more embodiments.

FIG. 8 is a process 800 for driving a display array, in accordance with one or more embodiments. A display device may perform the operations of the process 800. For example, the display device 220 of FIG. 2 may perform operations of the process 800. In other embodiments, other entities may perform some or all of the operations of FIG. 8. Embodiments may include different and/or additional operations, or performing operations in different orders A display device receives 810 a scan signal at a first gate driver of a display. The first gate driver may be connected to a second gate driver and a third gate driver. The second gate driver may further be connected to the third gate driver. For example, the gate driver 702*b* of FIG. 7 may be a first gate driver connected to a gate driver 702*c*, a second gate driver, and a gate driver 702*d*, a third gate driver. The gate driver 702*c* may be connected to the gate driver 702*d*. The gate driver 702*b* may receive a scan signal from another gate driver or from a DDIC (e.g., a DDIC of the display device 220).

The display device transmits 820 the scan signal to a first scan line. The first scan line may be connected to a first subset of a set of pixels formed to have a first resolution. For example, the scan signal received by the gate driver 702*b* may be transmitted to the scan line 703*b*. The scan line 703*b* is connected to pixels having a low resolution. Embodiments of FIGS. 3A-5C depict low resolution scan lines coupled to pixel cells formed to have a low resolution (e.g., the scan lines 302). The scan line 703*b* may be similarly configured.

The display device transmits 830 the scan signal to the third gate driver. The scan signal may bypass the second gate driver. The transmission 830 may occur in parallel with the transmission 820 to the first scan line. In one example, the gate driver 702*b* may transmit the received 810 scan signal to the gate driver 702*d*. By receiving the signal from the gate driver 702*b* rather than the gate driver 702*c*, which may be customarily in a driving configuration where the scan signal is transmitted sequentially, row to row, from one gate driver to the gate driver of the immediate next row, the display device bypasses the gate driver 702*c* and the corresponding row of the display. While the process 800 for driving a display array involves bypassing a gate driver, a display array may also be driven by alternative processes which do not bypass a gate driver. For example, where the gate driver 702*c* is omitted from the display array 700, the display device may transmit a scan signal from the gate driver 7702*b* to the gate driver 702*d* without bypassing a gate driver.

System Environment

Figure 9:
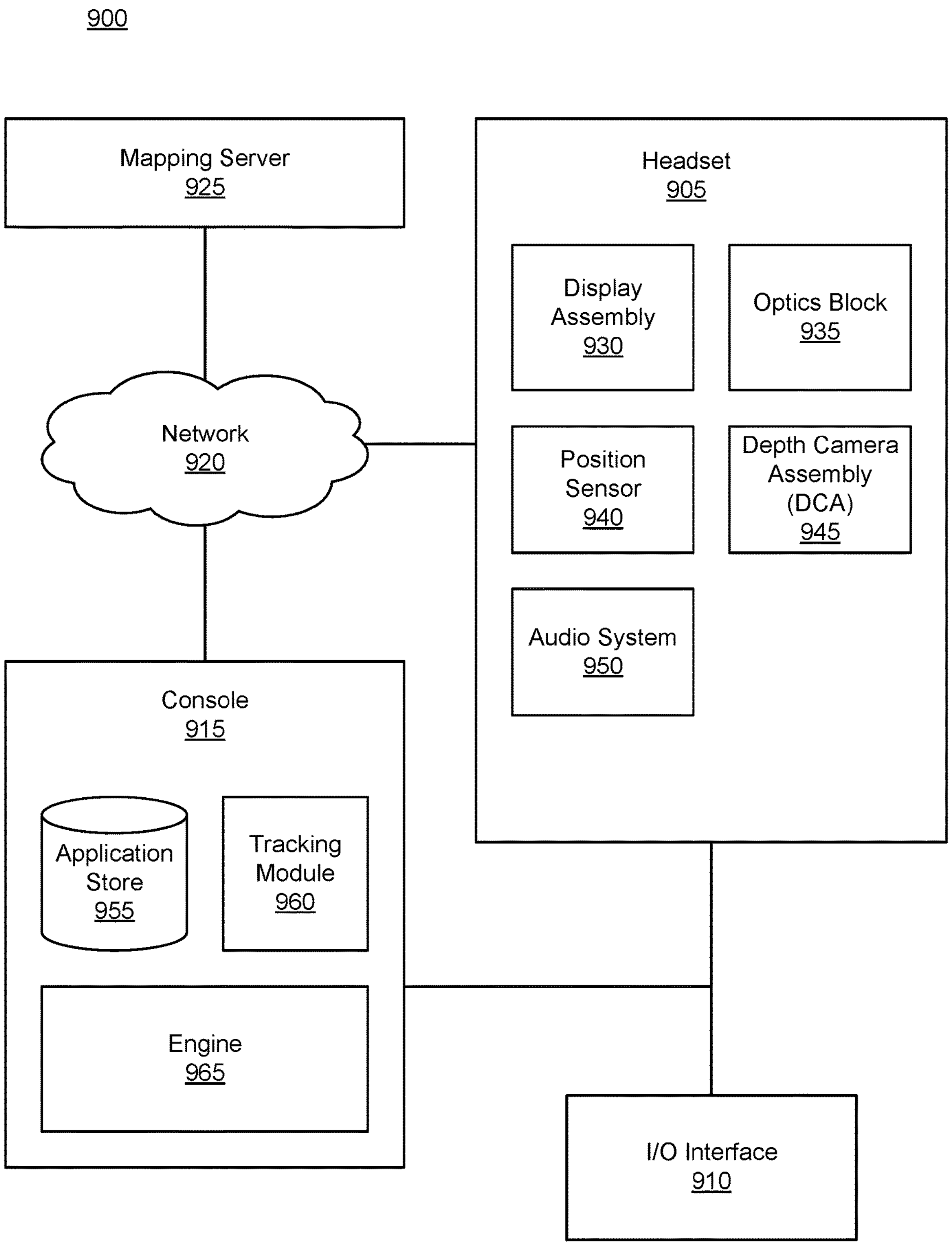
FIG. 9 is a system that includes a headset, in accordance with one or more embodiments.

FIG. 9 is a system 900 that includes a headset 905, in accordance with one or more embodiments. In some embodiments, the headset 905 may be the headset 100 of FIG. 1A or the headset 105 of FIG. 1B. The system 900 may operate in an artificial reality environment (e.g., a virtual reality environment, an augmented reality environment, a mixed reality environment, or some combination thereof). The system 900 shown by FIG. 9 includes the headset 905, an input/output (I/O) interface 910 that is coupled to a console 915, the network 920, and the mapping server 925. While FIG. 9 shows an example system 900 including one headset 905 and one I/O interface 910, in other embodiments any number of these components may be included in the system 900. For example, there may be multiple headsets each having an associated I/O interface 910, with each headset and I/O interface 910 communicating with the console 915. In alternative configurations, different and/or additional components may be included in the system 900. Additionally, functionality described in conjunction with one or more of the components shown in FIG. 9 may be distributed among the components in a different manner than described in conjunction with FIG. 9 in some embodiments. For example, some or all of the functionality of the console 915 may be provided by the headset 905.

The headset 905 includes the display assembly 930, an optics block 935, one or more position sensors 940, and the DCA 945. Some embodiments of headset 905 have different components than those described in conjunction with FIG. 9. Additionally, the functionality provided by various components described in conjunction with FIG. 9 may be differently distributed among the components of the headset 905 in other embodiments, or be captured in separate assemblies remote from the headset 905.

The display assembly 930 displays content to the user in accordance with data received from the console 915. The display assembly 930 displays the content using one or more display elements (e.g., the display elements 120). A display element may be, e.g., an electronic display. In various embodiments, the display assembly 930 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 935.

The optics block 935 may magnify image light received from the electronic display, corrects optical errors associated with the image light, and presents the corrected image light to one or both eyeboxes of the headset 905. In various embodiments, the optics block 935 includes one or more optical elements. Example optical elements included in the optics block 935 include: an aperture, a Fresnel lens, a convex lens, a concave lens, a filter, a reflecting surface, or any other suitable optical element that affects image light. Moreover, the optics block 935 may include combinations of different optical elements. In some embodiments, one or more of the optical elements in the optics block 935 may have one or more coatings, such as partially reflective or anti-reflective coatings.

Magnification and focusing of the image light by the optics block 935 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 935 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 935 corrects the distortion when it receives image light from the electronic display generated based on the content.

The position sensor 940 is an electronic device that generates data indicating a position of the headset 905. The position sensor 940 generates one or more measurement signals in response to motion of the headset 905. The position sensor 190 is an embodiment of the position sensor 940. Examples of a position sensor 940 include: one or more IMUS, one or more accelerometers, one or more gyroscopes, one or more magnetometers, another suitable type of sensor that detects motion, or some combination thereof. The position sensor 940 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 905 from the sampled data. For example, the IMU integrates the measurement signals received from the accelerometers over time to estimate a velocity vector and integrates the velocity vector over time to determine an estimated position of a reference point on the headset 905. The reference point is a point that may be used to describe the position of the headset 905. While the reference point may generally be defined as a point in space, however, in practice the reference point is defined as a point within the headset 905.

The DCA 945 generates depth information for a portion of the local area. The DCA includes one or more imaging devices and a DCA controller. The DCA 945 may also include an illuminator. Operation and structure of the DCA 945 is described above with regard to FIG. 1A.

The audio system 950 provides audio content to a user of the headset 905. The audio system 950 is substantially the same as the audio system 200 describe above. The audio system 950 may comprise one or acoustic sensors, one or more transducers, and an audio controller. The audio system 950 may provide spatialized audio content to the user. In some embodiments, the audio system 950 may request acoustic parameters from the mapping server 925 over the network 920. The acoustic parameters describe one or more acoustic properties (e.g., room impulse response, a reverberation time, a reverberation level, etc.) of the local area. The audio system 950 may provide information describing at least a portion of the local area from e.g., the DCA 945 and/or location information for the headset 905 from the position sensor 940. The audio system 950 may generate one or more sound filters using one or more of the acoustic parameters received from the mapping server 925, and use the sound filters to provide audio content to the user.

The I/O interface 910 is a device that allows a user to send action requests and receive responses from the console 915. An action request is a request to perform a particular action. For example, an action request may be an instruction to start or end capture of image or video data, or an instruction to perform a particular action within an application. The I/O interface 910 may include one or more input devices. Example input devices include: a keyboard, a mouse, a game controller, or any other suitable device for receiving action requests and communicating the action requests to the console 915. An action request received by the I/O interface 910 is communicated to the console 915, which performs an action corresponding to the action request. In some embodiments, the I/O interface 910 includes an IMU that captures calibration data indicating an estimated position of the I/O interface 910 relative to an initial position of the I/O interface 910. In some embodiments, the I/O interface 910 may provide haptic feedback to the user in accordance with instructions received from the console 915. For example, haptic feedback is provided when an action request is received, or the console 915 communicates instructions to the I/O interface 910 causing the I/O interface 910 to generate haptic feedback when the console 915 performs an action.

The console 915 provides content to the headset 905 for processing in accordance with information received from one or more of: the DCA 945, the headset 905, and the I/O interface 910. In the example shown in FIG. 9, the console 915 includes an application store 955, a tracking module 960, and an engine 965. Some embodiments of the console 915 have different modules or components than those described in conjunction with FIG. 9. Similarly, the functions further described below may be distributed among components of the console 915 in a different manner than described in conjunction with FIG. 9. In some embodiments, the functionality discussed herein with respect to the console 915 may be implemented in the headset 905, or a remote system.

The application store 955 stores one or more applications for execution by the console 915. An application is a group of instructions, that when executed by a processor, generates content for presentation to the user. Content generated by an application may be in response to inputs received from the user via movement of the headset 905 or the I/O interface 910. Examples of applications include: gaming applications, conferencing applications, video playback applications, or other suitable applications.

The tracking module 960 tracks movements of the headset 905 or of the I/O interface 910 using information from the DCA 945, the one or more position sensors 940, or some combination thereof. For example, the tracking module 960 determines a position of a reference point of the headset 905 in a mapping of a local area based on information from the headset 905. The tracking module 960 may also determine positions of an object or virtual object. Additionally, in some embodiments, the tracking module 960 may use portions of data indicating a position of the headset 905 from the position sensor 940 as well as representations of the local area from the DCA 945 to predict a future location of the headset 905. The tracking module 960 provides the estimated or predicted future position of the headset 905 or the I/O interface 910 to the engine 965.

The engine 965 executes applications and receives position information, acceleration information, velocity information, predicted future positions, or some combination thereof, of the headset 905 from the tracking module 960. Based on the received information, the engine 965 determines content to provide to the headset 905 for presentation to the user. For example, if the received information indicates that the user has looked to the left, the engine 965 generates content for the headset 905 that mirrors the user's movement in a virtual local area or in a local area augmenting the local area with additional content. Additionally, the engine 965 performs an action within an application executing on the console 915 in response to an action request received from the I/O interface 910 and provides feedback to the user that the action was performed. The provided feedback may be visual or audible feedback via the headset 905 or haptic feedback via the I/O interface 910.

The network 920 couples the headset 905 and/or the console 915 to the mapping server 925. The network 920 may include any combination of local area and/or wide area networks using both wireless and/or wired communication systems. For example, the network 920 may include the Internet, as well as mobile telephone networks. In one embodiment, the network 920 uses standard communications technologies and/or protocols. Hence, the network 920 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 920 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 920 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 925 may include a database that stores a virtual model describing a plurality of spaces, wherein one location in the virtual model corresponds to a current configuration of a local area of the headset 905. The mapping server 925 receives, from the headset 905 via the network 920, information describing at least a portion of the local area and/or location information for the local area. The user may adjust privacy settings to allow or prevent the headset 905 from transmitting information to the mapping server 925. The mapping server 925 determines, based on the received information and/or location information, a location in the virtual model that is associated with the local area of the headset 905. The mapping server 925 determines (e.g., retrieves) one or more acoustic parameters associated with the local area, based in part on the determined location in the virtual model and any acoustic parameters associated with the determined location. The mapping server 925 may transmit the location of the local area and any values of acoustic parameters associated with the local area to the headset 905.

One or more components of system 900 may contain a privacy module that stores one or more privacy settings for user data elements. The user data elements describe the user or the headset 905. For example, the user data elements may describe a physical characteristic of the user, an action performed by the user, a location of the user of the headset 905, a location of the headset 905, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 900 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display comprising:

a plurality of pixels on a substrate, wherein the plurality of pixels comprise:

a first set of pixels formed to have a first resolution, wherein a first subset of pixels of the first set of pixels is formed in a first pixel cell layout, and wherein the first subset of pixels comprises anodes formed in a first anode layout, a second set of pixels formed to have a second resolution, wherein a second subset of pixels of the second set of pixels is formed in a second pixel cell layout, and wherein the second subset of pixels comprises anodes formed in a second anode layout, and a third set of pixels formed to have the first resolution, wherein a third subset of pixels of the third set of pixels is formed in a third pixel cell layout different from the first pixel cell layout;

a first set of scan lines of a plurality of scan lines disposed on the substrate, wherein the first set of scan lines is connected to at least the first subset of pixels; and a second set of scan lines of the plurality of scan lines disposed on the substrate, wherein the second set of scan lines is connected to at least the second subset of pixels.

2. The display of claim 1, wherein a fourth subset of the third set of pixels is formed in a fourth pixel cell layout.

3. The display of claim 1, wherein the third pixel cell layout comprises:

two or more scan lines of the second set of scan lines, each of the two or more scan lines connected to a respective pixel of the third subset of pixels; and a plurality of display lines, wherein each of the plurality of display lines is connected to two or more pixels of the third subset of pixels.

4. The display of claim 2, wherein the fourth pixel cell layout comprises:

a scan line of the first set of scan lines connected to one of the fourth subset of pixels; and a plurality of display lines, wherein each of the plurality of display lines is connected to a respective pixel of the fourth subset of pixels.

5. The display of claim 1, wherein the first set of scan lines is further connected to at least one of the third set of pixels having the third pixel cell layout.

6. The display of claim 2, wherein the second set of scan lines is further connected to at least one of the third set of pixels having the fourth pixel cell layout.

7. The display of claim 1, wherein the third subset of pixels comprises anodes formed in the second anode layout.

8. The display of claim 1, further comprising a plurality of scan line drivers connected to the plurality of scan lines, wherein the plurality of scan line drivers are configured to drive a scan signal to two or more subpixels of the third subset of pixels, the two or more subpixels associated with a same color.

9. The display of claim 1, wherein the first pixel cell layout comprises:

a scan line of the first set of scan lines; and a bypassed scan line of the first set of scan lines.

10. The display of claim 1, wherein the second pixel cell layout comprises:

two or more scan lines of the second set of scan lines, each of the two or more scan lines connected to at least two pixels of the second subset of pixels; and a plurality of display lines, each of the plurality of display lines connected to two or more pixels of the second subset of pixels.

11. The display of claim 1, further comprising a plurality of scan line drivers connected to the plurality of scan lines, wherein a pair of sequentially connected scan line drivers comprises a scan line driver that is bypassed, the bypassed scan line driver connected to a bypassed scan line of the plurality of scan lines.

12. A display comprising:

a plurality of pixels on a substrate, wherein the plurality of pixels comprise:

a first set of pixels formed to have a first resolution, wherein a first subset of pixels of the first set of pixels is formed in a first pixel cell layout, and a second set of pixels formed to have a second resolution, wherein a second subset of the second set of pixels is formed in a second pixel cell layout, wherein the first set of pixels having the first resolution includes a third subset of pixels, wherein the third subset of pixels of the first set of pixels is formed in a third pixel cell layout different from the first pixel cell layout;

a first set of scan lines of a plurality of scan lines disposed on the substrate, wherein the first set of scan lines is connected to at least the first subset of pixels; and a second set of scan lines of the plurality of scan lines disposed on the substrate, wherein the second set of scan lines is connected to at least the second subset of pixels.

13. The display of claim 12, wherein the first pixel cell layout comprises one of the first set of scan lines, twelve driving transistors, and three switching transistors.

14. The display of claim 12, wherein the third pixel cell layout comprises two of the second set of scan lines, twelve driving transistors, and six switching transistors.

15. The display of claim 12, wherein a fourth subset of pixels of the first set of pixels is formed in a fourth pixel cell layout comprising one of the first set of scan lines, twelve driving transistors, and six switching transistors.

16. The display of claim 12, wherein the first pixel cell layout comprises:

a scan line of the first set of scan lines; and a bypassed scan line of the first set of scan lines.

17. The display of claim 12, wherein the second pixel cell layout comprises:

two or more scan lines of the second set of scan lines, each of the two or more scan lines connected to at least two of the second subset of pixels; and a plurality of display lines, each of the plurality of display lines connected to two or more pixels of the second subset of pixels.

18. The display of claim 12, further comprising a plurality of scan line drivers connected to the plurality of scan lines, wherein a pair of sequentially connected scan line drivers comprises a scan line driver that is bypassed, the bypassed scan line driver connected to a bypassed scan line of the plurality of scan lines.

19. A method comprising:

receiving, at a first gate driver of a display, a scan signal, wherein the first gate driver is connected to a second gate driver of the display and a third gate driver of the display, and wherein the second gate driver is further connected to the third gate driver;

transmitting the scan signal to a first scan line of the display, the first scan line connected to a first subset of pixels of a first set of pixels of a plurality of pixels of the display, wherein the first set of pixels is formed to have a first resolution; and transmitting the scan signal to the third gate driver, wherein the scan signal bypasses the second gate driver, wherein the display comprises:

the plurality of pixels on a substrate, wherein the plurality of pixels comprise:

the first set of the plurality of pixels formed to have the first resolution, wherein the first subset of pixels of the first set of pixels is formed in a first pixel cell layout, a second set of the plurality of pixels formed to have a second resolution, wherein a second subset of the second set of pixels is formed in a second pixel layout, and a third set of pixels formed to have the first resolution, wherein a third subset of pixels of the third set of pixels is formed in a third pixel cell layout different from the first pixel cell layout;

a first set of scan lines disposed on the substrate, wherein the first set of scan lines is connected to at least the first subset of pixels; and a second set of scan lines disposed on the substrate, wherein the second set of scan lines is connected to at least the second subset of pixels and the third subset of pixels.

20. The display of claim 1, wherein:

the second set of scan lines is connected to at least the second subset of pixels and the third subset of pixels; and/or the display includes a set of display lines connected to the first subset of pixels and the second subset of pixels, but not connected to the third subset of pixels.

* * * * *